United States Patent
Bertrand et al.

(10) Patent No.: US 10,921,802 B2
(45) Date of Patent: Feb. 16, 2021

(54) HANDHELD DEVICE FOR NAVIGATING A MARINE VESSEL

(71) Applicant: Garmin Switzerland GmbH, Schaffhausen (CH)

(72) Inventors: Paul M. Bertrand, Olathe, KS (US); Jeremy J. Langford, Kansas City, MO (US)

(73) Assignee: Garmin Switzerland GmbH

(*) Notice: Subject to any disclaimer, the term of this patent is extended or adjusted under 35 U.S.C. 154(b) by 368 days.

(21) Appl. No.: 15/897,980

(22) Filed: Feb. 15, 2018

(65) Prior Publication Data
US 2019/0137993 A1 May 9, 2019

Related U.S. Application Data

(60) Provisional application No. 62/582,771, filed on Nov. 7, 2017.

(51) Int. Cl.
*G05D 1/00* (2006.01)
*B63H 25/02* (2006.01)
(Continued)

(52) U.S. Cl.
CPC ......... *G05D 1/0016* (2013.01); *B63H 20/007* (2013.01); *B63H 25/02* (2013.01); *G06F 1/1694* (2013.01); *G06F 3/017* (2013.01); *G06F 3/04847* (2013.01); *G06F 3/04883* (2013.01); *B63H 2025/028* (2013.01); *G06F 3/0488* (2013.01)

(58) Field of Classification Search
CPC ... G05D 1/0016; G06F 3/017; G06F 3/04883; G06F 1/1694; G06F 3/04847; G06F 3/0488; B63H 20/007; B63H 25/02; B63H 2025/028

USPC ............................................................ 701/2
See application file for complete search history.

(56) References Cited

U.S. PATENT DOCUMENTS

| 5,892,338 A * | 4/1999 | Moore | B63H 20/007 318/16 |
| 6,273,771 B1 * | 8/2001 | Buckley | B63H 21/213 114/144 RE |

(Continued)

OTHER PUBLICATIONS

Minn Kota i-Pilot® Quick Reference Guide, Johnson Outdoors Marine Electronics, Inc. from https://minnkotamotors.johnsonoutdoors.com/sites/johnsonoutdoors-store/files/product/minbowmountl3/1082359/ProductManual/MIN_productmanual_i-Pilot-BT-EN-Qrg.pdf, Mar. 2016.

(Continued)

*Primary Examiner* — Jonathan M Dager
*Assistant Examiner* — Jean W Charleston
(74) *Attorney, Agent, or Firm* — Samuel M. Korte; Max M. Ali

(57) ABSTRACT

A handheld device for navigating a marine vessel includes a magnetometer, and inertial sensor, and a controller. The controller is communicatively coupled to the magnetometer and the inertial sensor. The controller is configured to receive a directional measurement from the magnetometer. The controller is also configured to receive an orientation measurement from the inertial sensor. The controller is configured to generate at least one control signal for a motor of the marine vessel at least partially based on the directional measurement and the orientation measurement.

12 Claims, 20 Drawing Sheets

(51) Int. Cl.
*G06F 3/0484* (2013.01)
*G06F 1/16* (2006.01)
*G06F 3/0488* (2013.01)
*B63H 20/00* (2006.01)
*G06F 3/01* (2006.01)

(56) References Cited

U.S. PATENT DOCUMENTS

| | | | | |
|---|---|---|---|---|
| 8,992,274 | B1* | 3/2015 | Ward | B63H 21/20 440/1 |
| 9,359,057 | B1* | 6/2016 | Andrasko | B63H 20/12 |
| 9,994,296 | B1* | 6/2018 | Balogh | B63H 21/213 |
| 2002/0169527 | A1* | 11/2002 | Cline | G06Q 10/08 701/21 |
| 2012/0232719 | A1* | 9/2012 | Salmon | G01C 13/008 701/2 |
| 2015/0089427 | A1* | 3/2015 | Akuzawa | G05D 1/0206 715/771 |
| 2016/0097875 | A1* | 4/2016 | Kowalczyk | B63G 8/34 701/21 |
| 2016/0334792 | A1* | 11/2016 | Jopling | B63H 20/00 |
| 2017/0205828 | A1* | 7/2017 | Estabrook | B63H 25/38 |
| 2017/0336220 | A1* | 11/2017 | Broaddus | G01C 21/165 |
| 2019/0072951 | A1* | 3/2019 | Clark | G01S 13/88 |

OTHER PUBLICATIONS

Minn Kota i-Pilot® Link™ Quick Reference Guide, Johnson Outdoors Marine Electronics, Inc. from http://minnkatomators.johnsonoutdoors.com/sites/johnsonoutdoors-store/files/product/minbowmountl3/1082332/ProductManual/MIN_productmanual_i-Pilot-Link-BT-EN-QRG.pdf , 2016.

Minn Kota i-Pilot Micro Remote Quick Reference Guide—https://minnkotamotors.johnsonoutdoors.com/sites/johnsonoutdoors-store/files/product/minaccessoriesl3/1082173/ProductManual/MIN_productmanual_MicroRemoteBT-QRG.pdf from 2016.

MotorGuide xi5 Wireless Trolling Motor, Mercury Marine http://www.motorguide.com/userfiles/file/Support/OwnersManuals/90-8M0082949_Xi5.pdf 2013, p. 22.

* cited by examiner

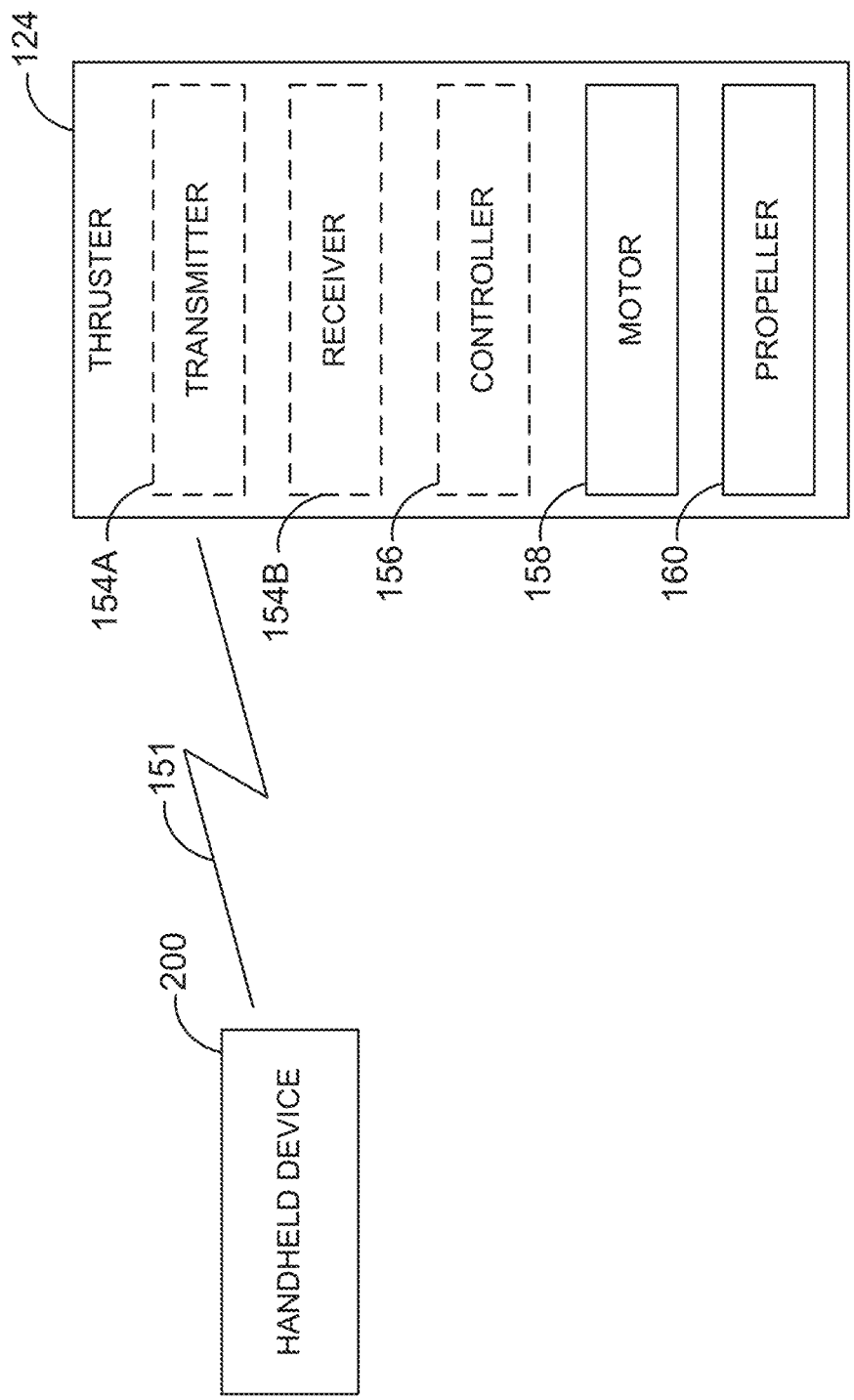

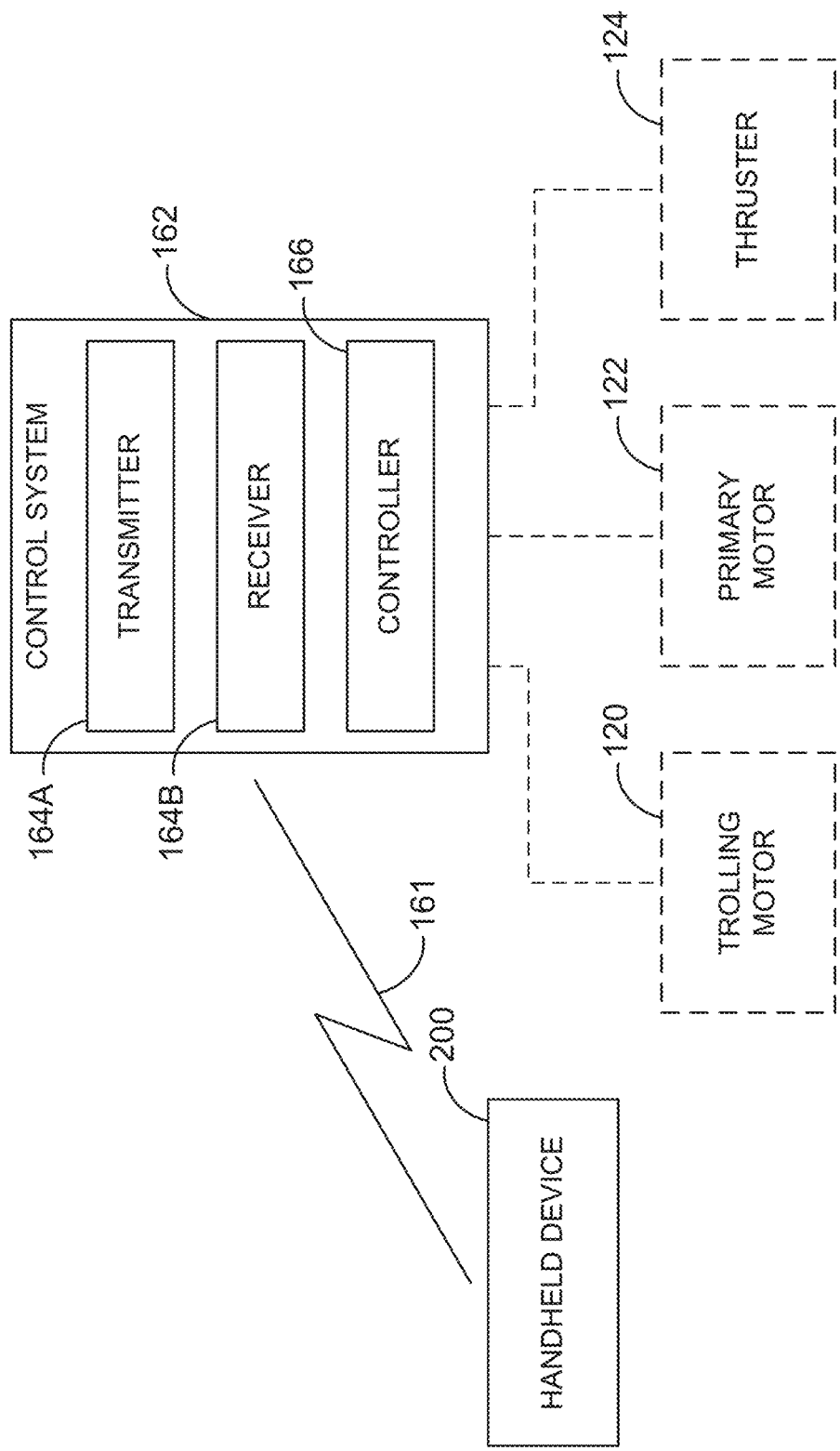

HANDHELD DEVICE FOR NAVIGATING A MARINE VESSEL

RELATED APPLICATION

The present application claims the benefit under 35 U.S.C. § 119(e) of U.S. Provisional Application Ser. No. 62/582,771, entitled "Handheld Device for Navigating a Marine Vessel," filed on Nov. 7, 2017, which is herein incorporated by reference in its entirety.

BACKGROUND

A marine vessel can employ one or more motors to navigate the marine vessel. For example, a marine vessel typically has a primary motor (e.g., a propulsion motor) that actuates the marine vessel through the water. In some cases, a marine vessel can further include at least one secondary motor (e.g., a trolling motor and/or thruster) that can be used instead of or in addition to the primary motor in certain situations. For example, a user may prefer to use the trolling motor instead of the primary motor when navigating the marine vessel at low speeds or through environments that require precision (e.g., navigating around obstacles and/or in shallow water). Another example is where a trolling motor and/or thruster can be used in combination with the primary motor for enhanced steering control of the marine vessel.

Motors (e.g., propulsion motors, trolling motors, and the like) can be controlled manually. For example, a user can directly steer the motor using a tiller that is directly coupled to the motor. However, in many cases, it is not practical for the user to directly steer the motor. For example, when employing a front-mounted trolling motor, a user may be unable to simultaneously reach the (rear-mounted) primary motor and the front-mounted trolling motor. Some conventional handheld devices utilize wireless communication to enable a user to remotely control a motor on the marine vessel. These conventional handheld devices include a housing and typically include a user interface, a plurality of pushbuttons, or a combination thereof, to enable a user to manually control motor operation (e.g., propeller on/off, speed up, speed down, steer left, steer right, move (jog) a predetermined distance and/or direction, etc.) and select related functionality (e.g., selecting a speed of the motor, selecting a geographic location as a desired fixed location, selecting a current heading as a desired heading, etc.). However, the conventional handheld devices do not utilize a current direction or orientation of the handheld device housing to remotely control a motor on the marine vessel.

SUMMARY

A handheld device for navigating a marine vessel by remotely controlling one or more motors on the marine vessel is disclosed. The handheld device may include a magnetometer, an inertial sensor, and a controller. The controller is communicatively coupled to the magnetometer, the inertial sensor, and a memory configured to store measurements output by the magnetometer and the inertial sensor. The controller is configured to receive a directional measurement from the magnetometer. The controller is also configured to receive an orientation measurement from the inertial sensor. The controller is configured to generate a control signal for a motor of the marine vessel at least partially based on the directional measurement and/or the orientation measurement.

A method for navigating a marine vessel with a handheld device is also disclosed. The method includes receiving a directional measurement from a magnetometer of the handheld device. The method also includes receiving an orientation measurement from an inertial sensor of the handheld device. A control signal for a motor of the marine vessel is generated at least partially based on the directional measurement and the orientation measurement. The control signal is wirelessly transmitted to the motor. In implementations, at least one operational parameter of the motor (e.g., a heading of the motor, a speed of the motor, a direction of rotation of a propulsion motor housing, a rotational direction of a propeller, a speed of the propeller, any combination thereof, etc.) is adjusted based on the received control signal.

A system for navigating a marine vessel is also disclosed. The system includes a trolling motor and a handheld device in wireless communication with the trolling motor. The handheld device includes a magnetometer, an inertial sensor, and a controller. The controller is configured to receive a directional measurement from the magnetometer. The controller is also configured to receive an orientation measurement from the inertial sensor. The controller is configured to generate a control signal for the trolling motor at least partially based on the directional measurement and the orientation measurement.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 5D is a block diagram illustrating a handheld device for navigating a marine vessel, such as the handheld device illustrated in FIG. 5A, and a thruster in communication with the handheld device, in accordance with an example embodiment of the present disclosure.

FIG. 5E is a block diagram illustrating a handheld device for navigating a marine vessel, such as the handheld device illustrated in FIG. 5A, and a control system in communication with the handheld device, wherein the control system is configured to control at least one motor (e.g., at least one trolling motor, primary motor, and/or thruster) based on communications from the handheld device, in accordance with an example embodiment of the present disclosure.

DETAILED DESCRIPTION

A marine vessel (e.g., a boat) employs one or more motors to navigate the marine vessel through the water. For example, the marine vessel includes a primary motor (e.g., a propulsion motor) that moves the marine vessel through the water. In some embodiments, the marine vessel further includes at least one secondary motor, such as a trolling motor and/or thruster, that can be used instead of or in addition to the primary motor. Each secondary motor may include an upper housing, a propulsion motor housing, and a shaft between the upper housing and the propulsion motor housing. A propeller may be attached to or a part of the propulsion motor housing. Typically, at least a portion of both the propulsion motor housing and the propeller are submerged in water under a water surface.

Motors can be controlled manually. For example, a user may be able to directly steer certain motors using a tiller that is directly coupled to the motor. However, in many cases, it is not practical for the user to directly steer the motor. For example, when employing a front-mounted trolling motor, a user may be unable to simultaneously reach a rear-mounted primary motor and a front-mounted trolling motor. Steering wheels and/or foot pedals are frequently used to enable a user to control a remote motor via one or more mechanical linkages or electromechanical steering assemblies. However, the use of a steering wheel or foot pedal typically requires that additional hardware be mounted on the marine vessel. Moreover, steering wheels and foot pedals require the user to actively monitor the marine vessel's heading in relation to the position of the steering wheel and/or foot pedal. There is a need for less cumbersome devices for controlling marine vessel motors.

A handheld device for navigating a marine vessel by remotely controlling one or more motors on the marine vessel is disclosed herein. In embodiments, the handheld device includes a magnetometer, an inertial sensor, and a controller. The controller is communicatively coupled to the magnetometer, the inertial sensor, and a memory configure to store measurements output by the magnetometer and the inertial sensor. The controller is configured to receive a directional measurement from the magnetometer or the memory. The controller is also configured to receive an orientation measurement from the inertial sensor or the memory. The controller is configured to generate at least one control signal for a motor of the marine vessel at least partially based on the received directional measurement and the orientation measurement. The inertial sensor may include an accelerometer, a gyroscope, or any combination thereof.

Figure 1:
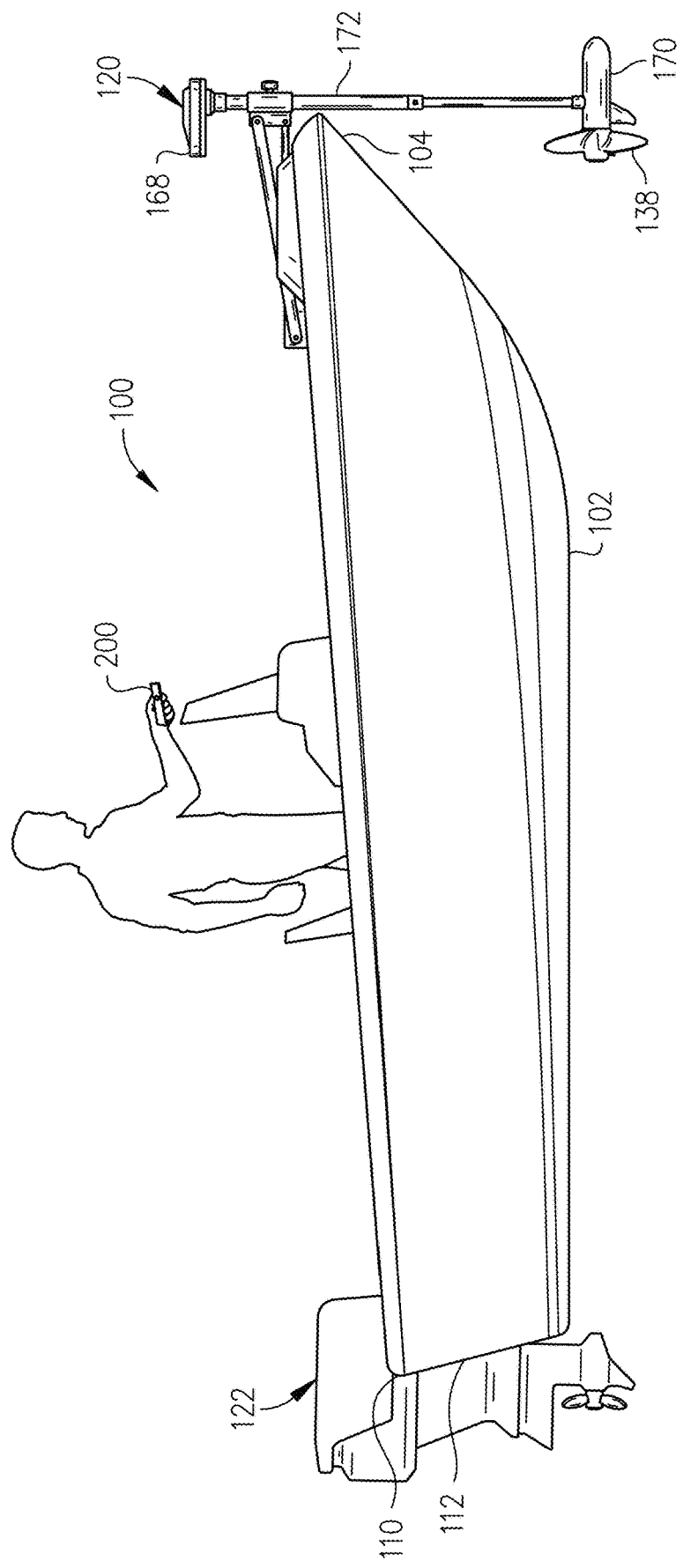
FIG. 1 is a side view of a marine vessel that can employ a handheld device for controlling one or more motors of the marine vessel, in accordance with an example embodiment of the present disclosure.

FIGS. 1 through 6D illustrate embodiments of a marine vessel 100 and a handheld device 200 for controlling one or more motors of the marine vessel 100. As shown in FIG. 1, the marine vessel 100 has at least one primary motor 122 that is the primary source of propulsion for navigating the marine vessel 100 through the water. In an embodiment, the primary motor 122 can be mounted to a rear portion (e.g., stern 110 and/or transom 112) of the marine vessel 100. In the embodiment shown in FIG. 1, the marine vessel 100 is also shown to include a trolling motor 120. For example, the trolling motor 120 may be mounted to a front portion (e.g., bow 104) of the marine vessel 100 (e.g., as shown in FIG. 2A). The trolling motor 120 may include an upper housing 168, a propulsion motor housing 170, and a cylindrical shaft 172 between the upper housing 168 and the propulsion motor housing 170. A propeller 138 may be attached to or a part of the propulsion motor housing 170. Typically, at least a portion of both the propulsion motor housing 170 and the propeller 138 are submerged in water under a water surface 125.

The trolling motor 120 can be operated simultaneously with the primary motor 122 to enhance steering capabilities of the marine vessel 100. In other situations, only the trolling motor 120 may be operated (instead of the primary motor 122) to navigate the marine vessel 100 at slower speeds and/or with greater precision (e.g., when navigating around obstacles, in shallow water, or the like). In some situations, the trolling motor 120 may be employed to navigate the marine vessel 100 instead of the primary motor 122 in order to reduce turbulence resulting from the marine vessel 100 as it is navigated through the water. For example, reduced turbulence may be desirable to avoid scaring away fish or avoid damage to aquatic environments.

Figure 2A:
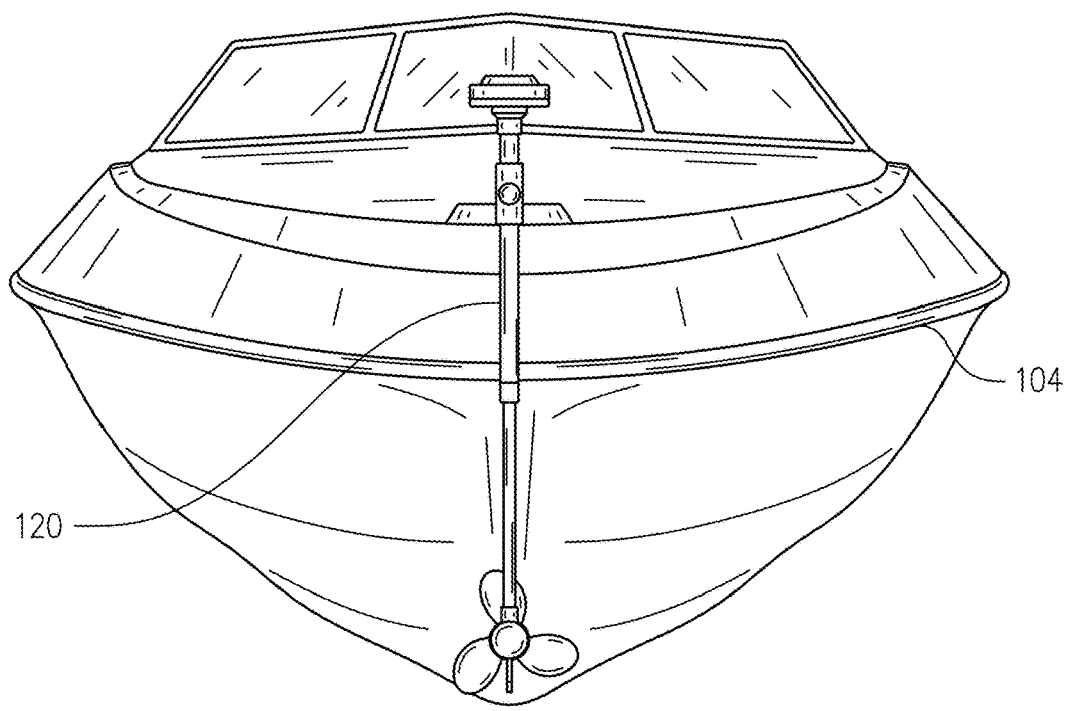
FIG. 2A is a front view of a marine vessel, such as the marine vessel illustrated in FIG. 1, with a front-mounted trolling motor, in accordance with an example embodiment of the present disclosure.
Figure 2B:
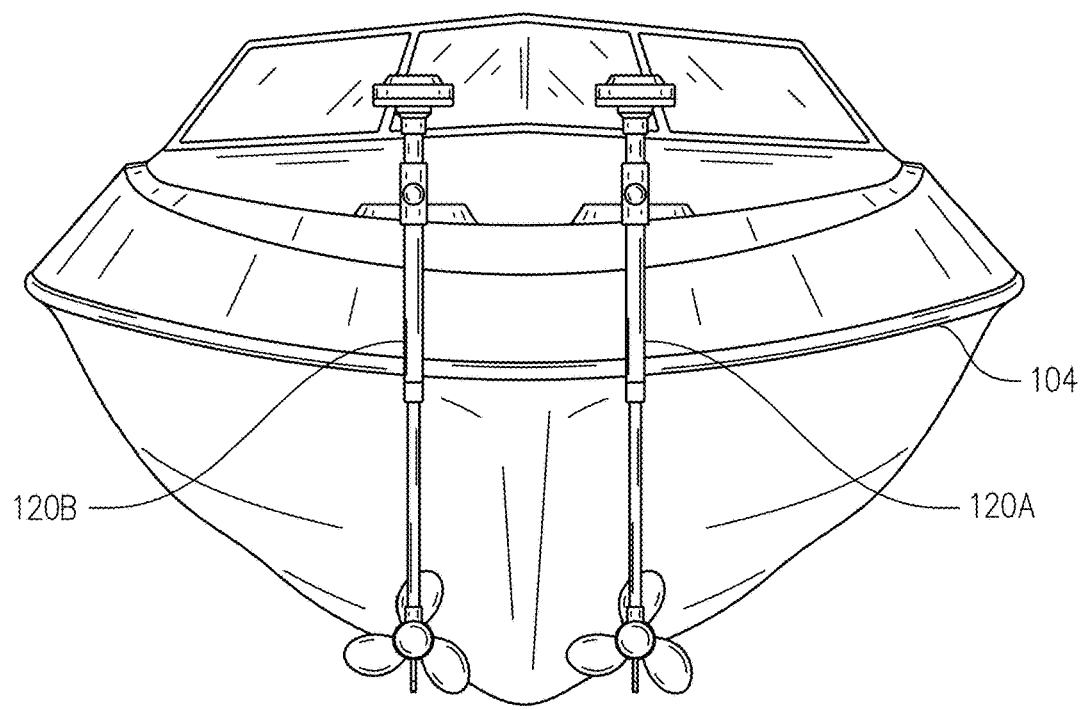
FIG. 2B is a front view of a marine vessel, such as the marine vessel illustrated in FIG. 1, with two front-mounted trolling motors, in accordance with an example embodiment of the present disclosure.
Figure 3A:
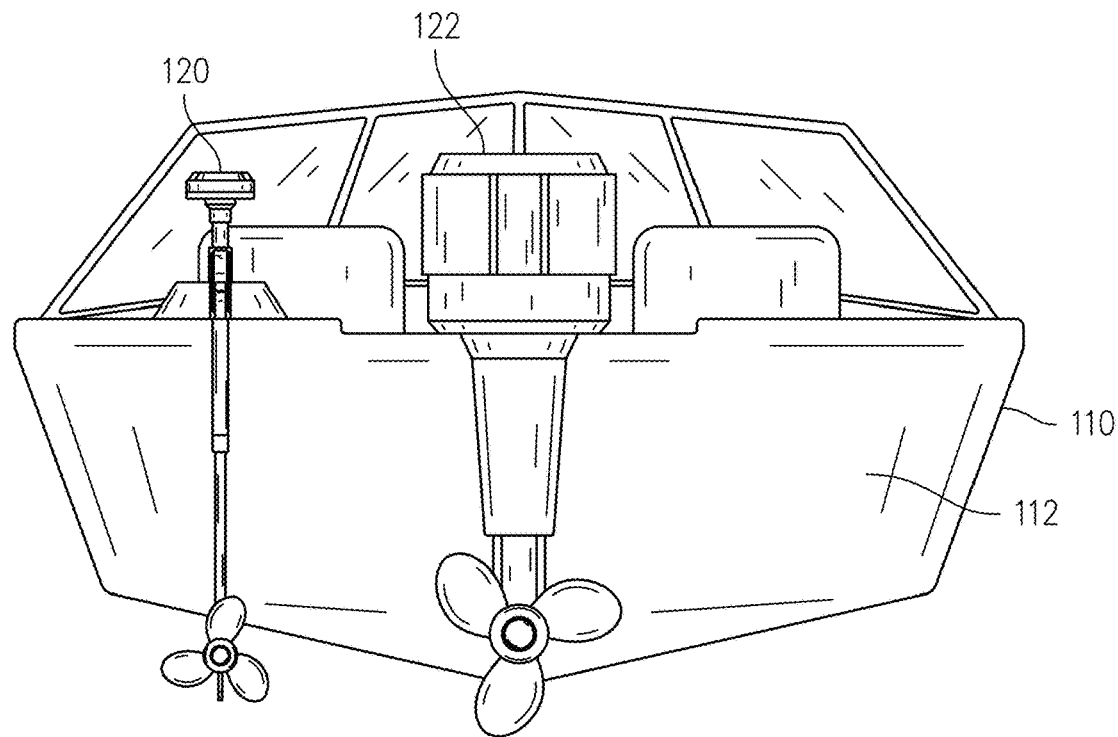
FIG. 3A is a rear view of a marine vessel, such as the marine vessel illustrated in FIG. 1, with a rear-mounted trolling motor, in accordance with an example embodiment of the present disclosure.
Figure 3B:
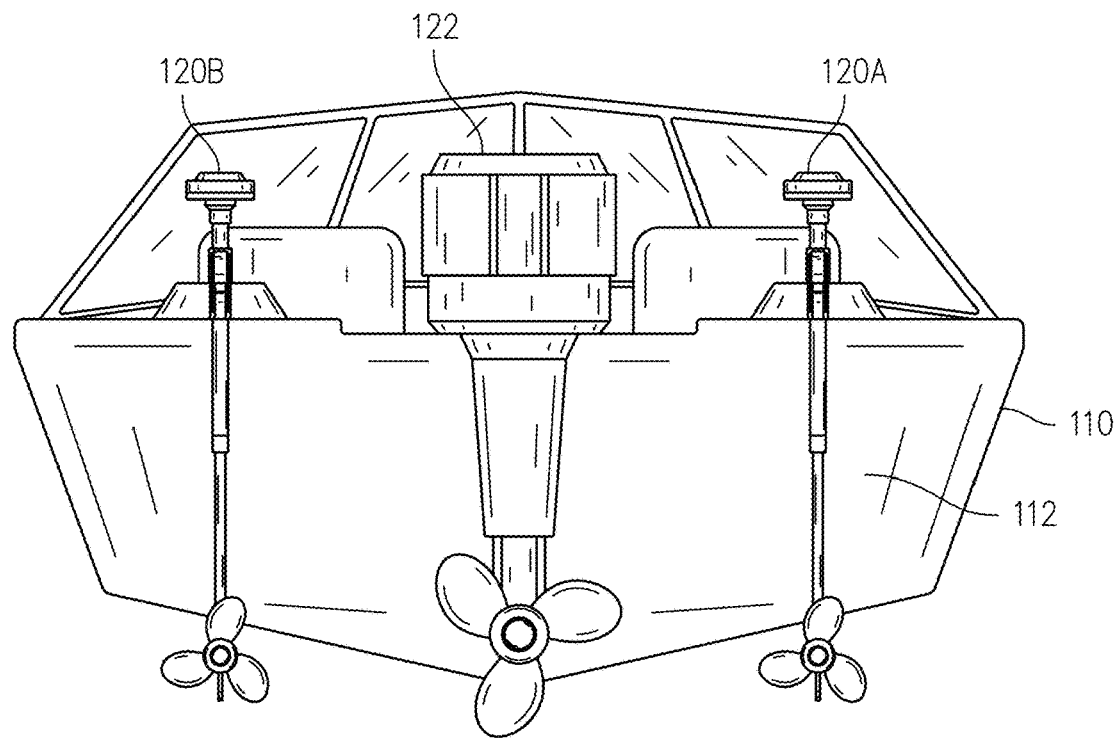
FIG. 3B is a rear view of a marine vessel, such as the marine vessel illustrated in FIG. 1, with two rear-mounted trolling motors, in accordance with an example embodiment of the present disclosure.

While a single front-mounted trolling motor 120 is shown in FIGS. 1 and 2A, the trolling motor 120 can be mounted to other portions of the marine vessel 120. For instance, the trolling motor 120 may be affixed to other portions of the marine vessel 120. In an embodiment, as shown in FIG. 3A, the trolling motor 120 can be mounted to a rear portion (e.g., stern 110 and/or transom 112) of the marine vessel 100. For example, the trolling motor 120 can be mounted in proximity to (e.g., alongside) the primary motor 122 at the stern 110 and/or transom 112 of the marine vessel 100. In some embodiments, the marine vessel 100 can have a plurality of trolling motors 120 for additional power and/or enhanced steering capability. For example, in an embodiment shown in FIG. 2B, the marine vessel 100 has two trolling motors (e.g., motors 120A and 120B) mounted to a front portion (e.g., bow 104) of the marine vessel 100. Alternatively, in an embodiment shown in FIG. 3B, the marine vessel 100 has two trolling motors (trolling motors 120A and 120B) mounted to a rear portion (e.g., stern 110 and/or transom 112) of the marine vessel 100. In other embodiments, the marine vessel 100 can have a plurality of front-mounted trolling motors 120 and a plurality of rear-mounted trolling motors 120. The foregoing embodiments are provided by way of example. The primary motor(s) 122 and trolling motor(s) 120 may be mounted in proximity to any location on the marine vessel 100 (e.g., at or near the bow 104, stern 110, starboard 108 or port 106 of the marine vessel 100) depending on the marine vessel 100 in which the motors are implemented.

Figure 4A:
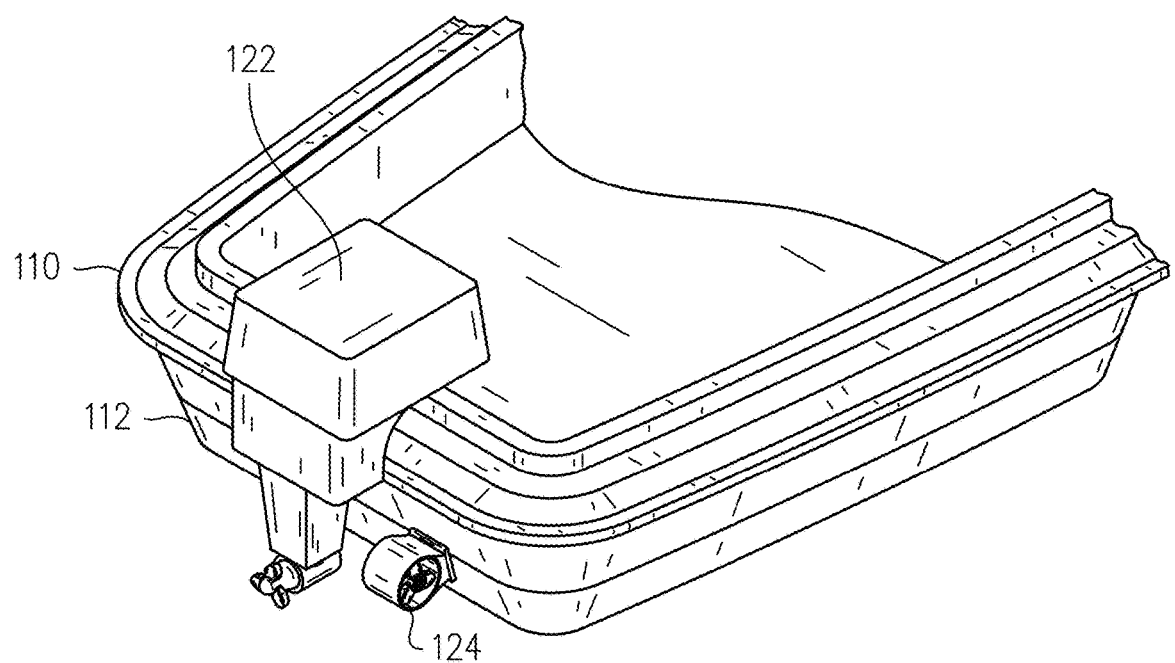
FIG. 4A is a perspective view of a rear portion of a marine vessel, such as the marine vessel illustrated in FIG. 1, with a rear-mounted thruster, in accordance with an example embodiment of the present disclosure.
Figure 4B:
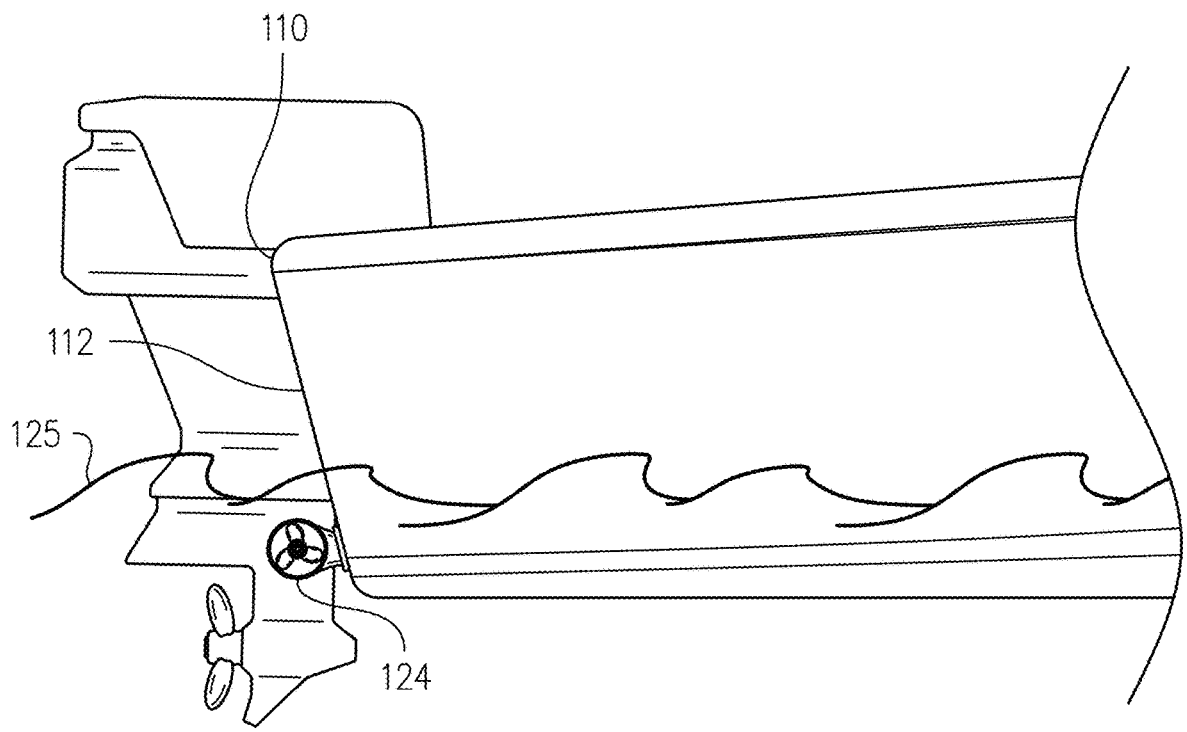
FIG. 4B is a side view of a rear portion of the marine vessel, such as the marine vessel illustrated in FIG. 1, with a rear-mounted thruster, in accordance with an example embodiment of the present disclosure.

FIGS. 4A and 4B show embodiments of the marine vessel 100 with at least one thruster 124 mounted to the hull 102 of the marine vessel 100. For example, the thruster 124 may be mounted in proximity to a rear portion (e.g., at or near the transom 112) of the marine vessel 100. The thruster 124 can be mounted to a portion of the marine vessel 100 that is typically below a water surface 125 when the marine vessel 100 is in the water. In embodiments, the thruster 124 is rigidly affixed to a portion of the hull 102 at a location that is typically below the water surface 125 (e.g., as shown in FIG. 4B). In embodiments, one or more thrusters 124 are configured to actuate the stern 110 of the marine vessel in a first direction (e.g., to the right) or a second direction (e.g., to the left) when the one or more thrusters 124 are active. In other embodiments, one or more thrusters 124 (e.g., one or more thrusters 124 mounted to a front portion of the marine vessel 100) are configured to actuate the bow 104 of the marine vessel in a first direction (e.g., to the right) or a second direction (e.g., to the left) when the one or more thrusters 124 are active. For example, at least one thruster 124 may be mounted in proximity to a front portion (e.g., bow 104) of the marine vessel 100 and/or in proximity to the starboard 108 or port 106. In some embodiments, at least one thruster 124 is mounted to a rear portion of the marine vessel 100 (e.g., as shown in FIGS. 4A and 4B) and at least one thruster is mounted to a front portion of the marine vessel 100 (e.g., at or near the bow 104). In such embodiments, the thrusters 124 are configured to selectively actuate the bow 104, the stern 110, or the marine vessel 100 in its entirety in a first direction (e.g., to the right) or a second direction (e.g., to the left) when some of the thrusters 124 (e.g., front or rear thrusters) or all of the thrusters 124 (e.g., front and rear) are active. The marine vessel 100 may employ one or more thrusters 124 for enhanced steering or control of the marine vessel 100 to help navigate through turbulent waters, for enhanced control when navigating the marine vessel 100 around obstacles, when parking the marine vessel 100, or in any other situation where it can be advantageous to actuate the marine vessel 100 or a portion (e.g., bow 104 or stern 110) of the marine vessel 100 in a generally left or right direction.

The marine vessel 100 can have any combination of primary motor(s) 122, trolling motor(s) 120, and thruster(s) 124 for navigating the marine vessel 100 through the water. For example, in an embodiment, the marine vessel 100 includes at least one primary motor 122 and at least one trolling motor 120 for navigating the marine vessel 100 through the water. In another embodiment, the marine vessel 100 includes at least one primary motor 122 and at least one trolling motor 120. In yet another embodiment, the marine vessel 100 includes at least one primary motor 122 and at least one thruster 124, or at least one trolling motor 120 and at least one thruster 124. Still in other embodiments, the marine vessel 100 includes at least one primary motor 122, at least one trolling motor 120, and at least one thruster 124.

Figure 5A:
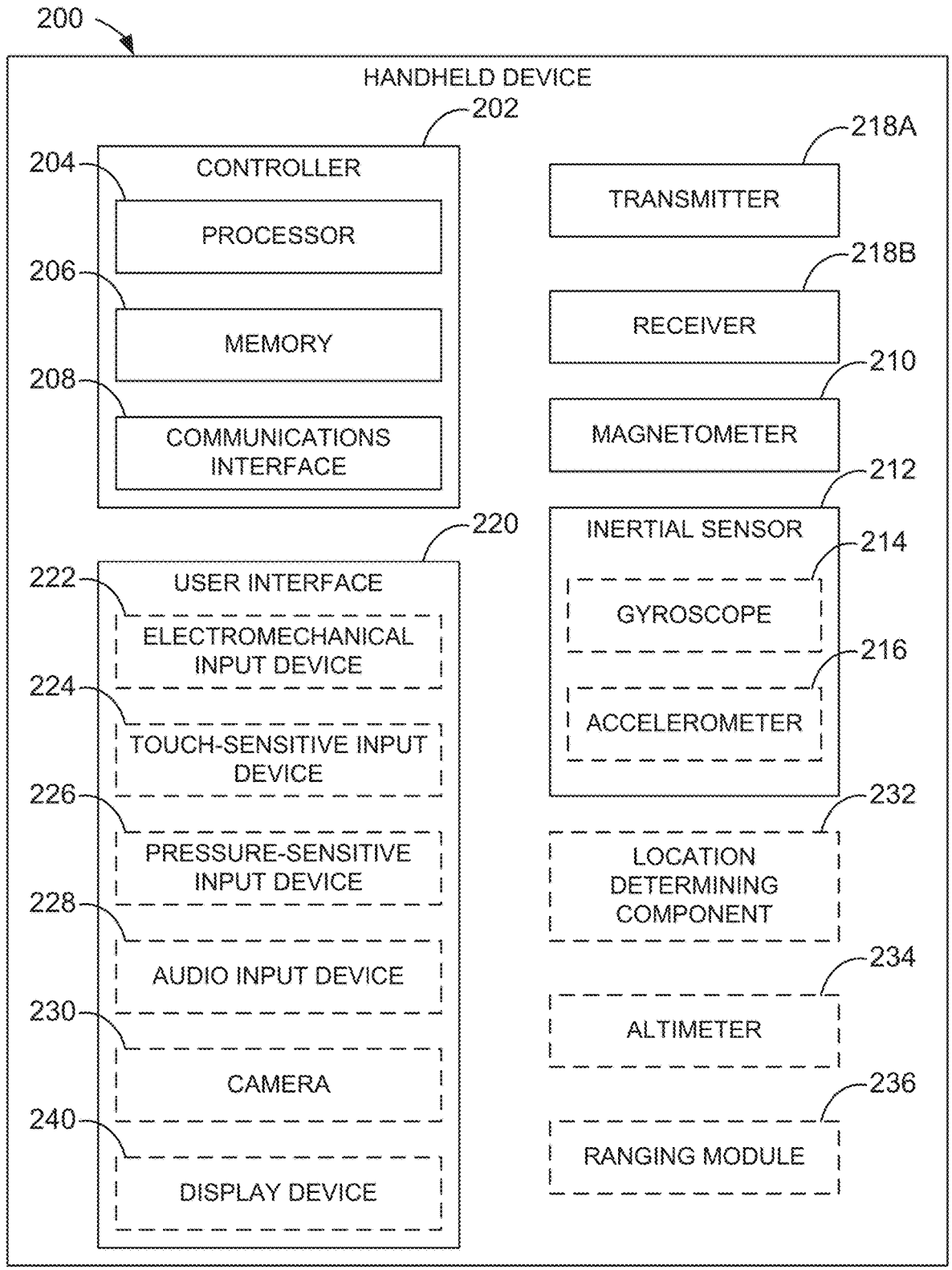
FIG. 5A is a block diagram illustrating components of a handheld device for navigating a marine vessel, such as the marine vessel illustrated in any of FIGS. 1 through 4B, or a combination thereof, in accordance with an example embodiment of the present disclosure.

FIG. 5A shows an embodiment of the handheld device 200 that is employed to remotely control one or more motors (e.g., trolling motor(s) 120, primary motor(s) 122, and/or thruster(s) 124) of the marine vessel 100. The handheld device 200 may include a housing that encloses components of the handheld device 200 and is of a form that enables a user to hold the handheld device 200 in one hand. In embodiments, the housing of the handheld device 200 may be a remote control or other mobile device, such as a smartphone, a tablet, a wrist-worn device (e.g., smartwatch, activity tracker, physiological monitor, etc.), a portable media player, a portable gaming device, or the like.

The handheld device 200 is configured to generate at least one control signal for the one or more motors based on a position (e.g., GPS coordinates, altitude, etc.), a pointing direction (e.g., North, East, South, West, etc.), and/or an orientation (e.g., pitch, roll, yaw, etc.) of the handheld device 200. In some embodiments, the handheld device 200 is also configured to generate at least one control signal for a motor based on a gesture performed with the handheld device 200. For example, a gesture can correspond to a series of detected position, direction, and/or orientation measurements.

Figure 6A:
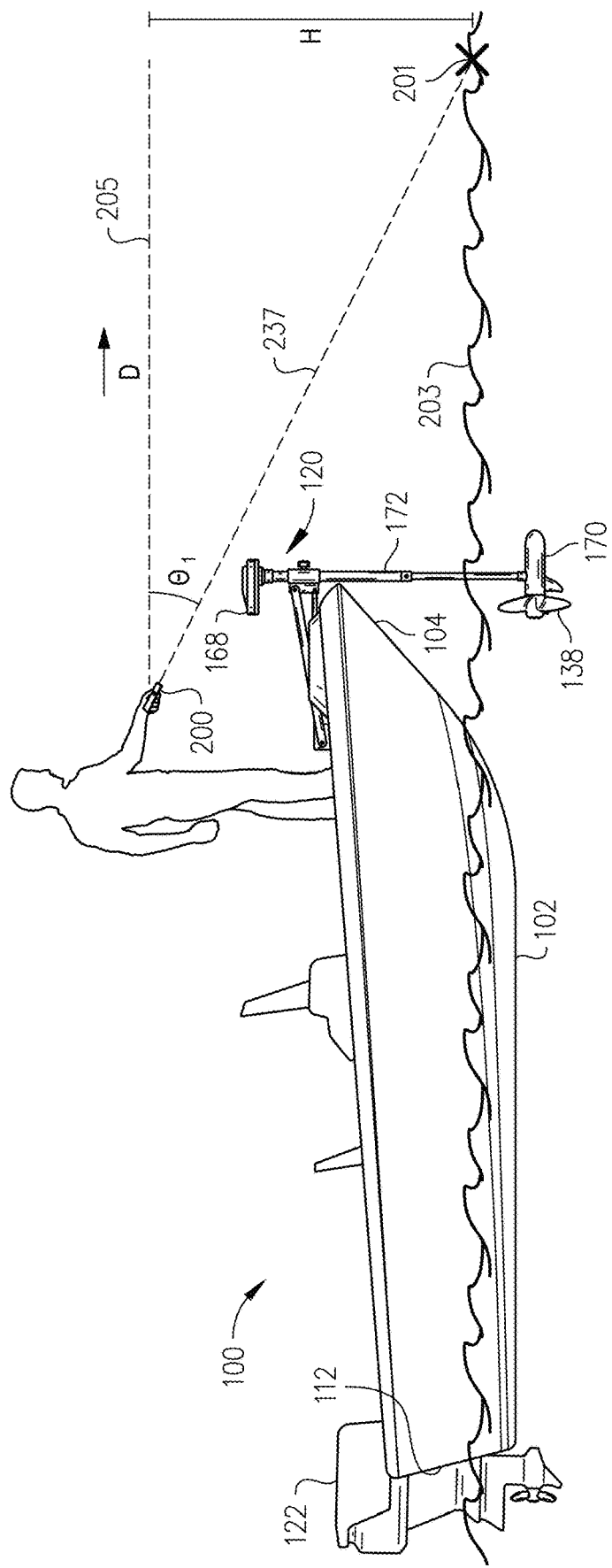
FIGS. 6A-6B illustrate an example environment in which a handheld device, such as the handheld device illustrated in FIG. 5A, is configured to navigate a marine vessel, such as the marine vessel illustrated in any of FIGS. 1 through 4B, or a combination thereof, by controlling at least one motor of the marine vessel according to a directional measurement and an orientation measurement collected while the handheld device is pointed at a location that is a selected destination for the marine vessel, in accordance with an example embodiment of the present disclosure.
Figure 6B:
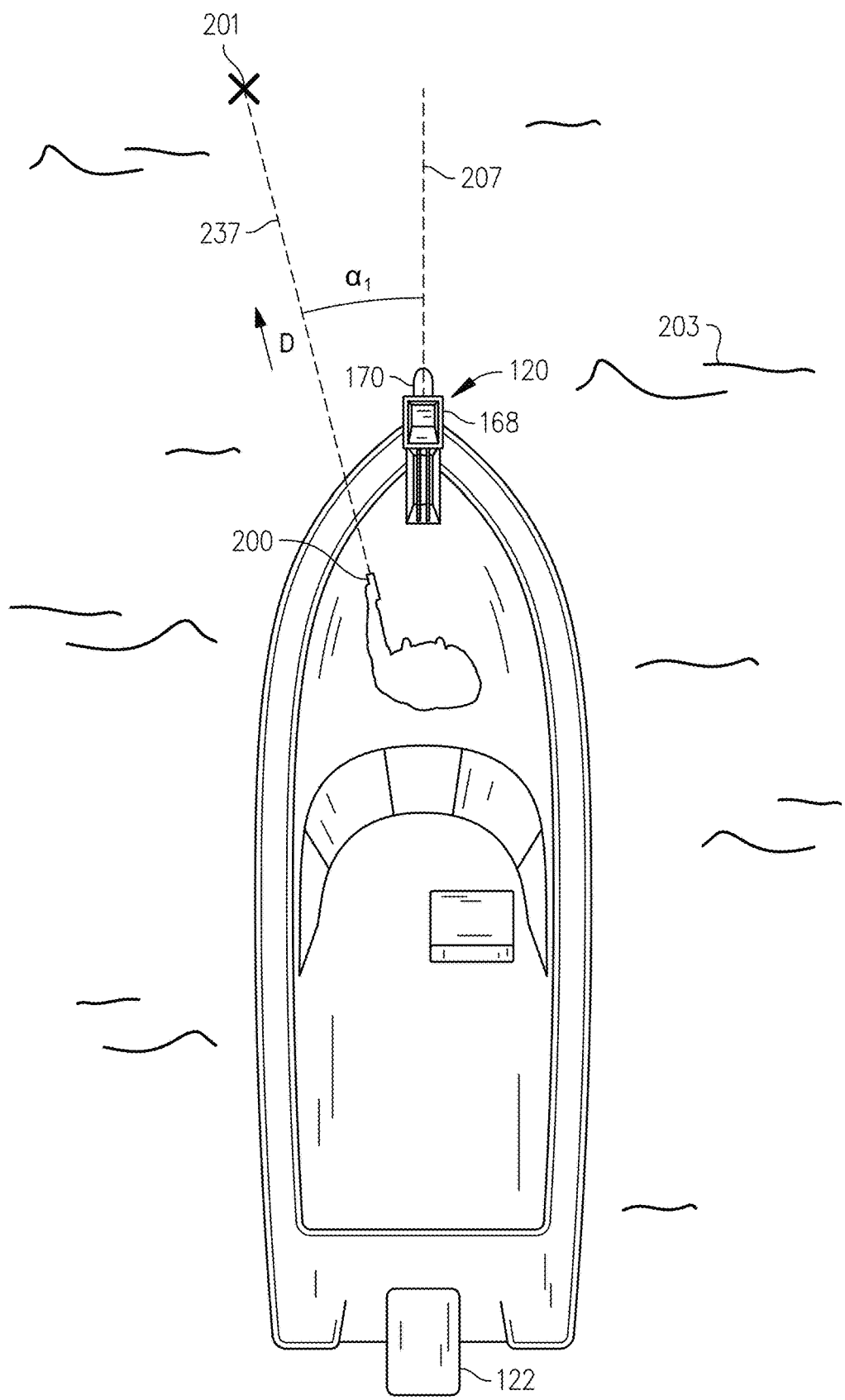

The handheld device 200 includes one or more sensors configured to determine an orientation, change in orientation, direction, and/or change in direction of the housing of the handheld device 200. For example, in an embodiment, the handheld device 200 includes a magnetometer 210 and an inertial sensor 212 (e.g., gyroscope 214, accelerometer 216, combination thereof, or the like). The magnetometer 210 is configured to determine and provide a directional measurement for the housing of the handheld device 200. The directional measurement may correspond to a current direction of the housing of the handheld device 200. For example, the magnetometer 210 may sense a direction in which the housing is pointed and a change in the direction. As shown in FIG. 6B, the directional measurement may be a direction D or a directional change angle $\alpha_1$. In some embodiments, the magnetometer 210 may be calibrated by pointing the housing of the handheld device 200 in a reference direction (e.g., North), where the magnetometer 210 is confirmed to be pointing in the reference direction and then determines one or more changes in the pointing direction of the handheld device 200 housing relative to the reference direction. The inertial sensor 212 is configured to determine and provide an orientation measurement for the housing of the handheld device 200. For example, the inertial sensor 212 may sense an orientation (e.g., pitch, roll, and/or yaw) of the housing of the handheld device 200 and a change in the orientation (e.g., a change in the pitch, roll, and/or yaw) of the handheld device 200 housing. In some embodiments, the inertial sensor 212 may be calibrated by placing the housing of the handheld device 200 in a reference orientation (e.g., vertical orientation, horizontal orientation, etc.), where the inertial sensor 212 is confirmed to be positioned in the reference orientation and then determines or more changes in the orientation of the handheld device 200 housing relative to the reference orientation.

The handheld device 200 includes at least one controller 202 communicatively coupled to the magnetometer 210, the inertial sensor 212, and a memory 206. The controller 202 may be configured to receive the directional measurement from the magnetometer 210 and the orientation measurement from the inertial sensor 212. In embodiments, the controller 202 may be confirmed to receive the directional measurement and the orientation measurement from the memory 206. The controller 202 may be configured to generate at least one control signal for a motor (e.g., trolling motor 120, primary motor 122, or thruster 124), or for multiple motors, of the marine vessel 100 at least partially based on the directional measurement and/or the orientation measurement. Operation of the one or more motors using the control signal received from the handheld device 200 may cause the marine vessel 100 to travel in a direction corresponding to the directional measurement, travel at a desired speed of travel corresponding to the orientation measurement, travel to a geographic location corresponding to the orientation measurement, or travel a distance corresponding to the orientation measurement. In embodiments, the controller 202 may control transmitter 218A to wirelessly communicate the control signal to a motor (e.g., trolling motor 120, primary motor 122, or thruster 124), of the marine vessel 100 when a user input is received from a user interface 220. In other embodiments, the controller 202 may control transmitter 218A to wirelessly communicate the control signal to a motor (e.g., trolling motor 120, primary motor 122, or thruster 124) continuously.

In some embodiments, the handheld device 200 only includes, or selectively relies on, one of the magnetometer 210 or the inertial sensor 212. For example, in an embodiment, the controller 202 may be configured to receive a directional measurement from the magnetometer 210 and generate at least one control signal for a motor (e.g., trolling motor 120, primary motor 122, or thruster 124), or for multiple motors, based on the directional measurement (e.g., based on the direction in which the housing of the handheld device 200 is pointed). In other embodiments, the controller 202 may be configured to receive an orientation measurement from the inertial sensor 212 and generate at least one control signal for a motor (e.g., trolling motor 120, primary motor 122, or thruster 124), or for multiple motors, based on the orientation measurement (e.g., based on the pitch, roll, and/or yaw of the housing of the handheld device 200).

In some embodiments, it can be advantageous to employ both the magnetometer 210 and the inertial sensor 212 simultaneously in order to generate control signals based a determined direction in which the housing of the handheld device 200 is pointed and a determined orientation of the housing. For example, the controller 202 may be configured to generate at least one control signal for a motor (e.g., trolling motor 120, primary motor 122, or thruster 124), or for multiple motors, based on a determined direction in which the housing is pointing and a determined tilt (e.g., downwards) of the handheld device 200. For example, the controller 202 may utilize the directional measurement and/or orientation measurement to determine that the housing of the handheld device 200 is pointing at a geographic location in the water, indicating a desired distance for the marine vessel 100 to travel, or indicating a desired speed of travel for the marine vessel 100. In some embodiments, the handheld device 200 also includes other components (e.g., additional sensor(s), input device(s), transmitter(s), receiver(s), transceiver(s), etc.) that can be used in conjunction with the magnetometer 210 and/or inertial sensor 212, as further described herein.

The controller 202 can be communicatively coupled with some or all of the components of the handheld device 200. For example, the controller 202 is communicatively coupled to the magnetometer 210 and inertial sensor 212. The controller 202 includes a processor 204 to control the components and functions of the handheld device 200 described herein using software, firmware, hardware (e.g., fixed logic circuitry), or a combination thereof. The terms "controller," "functionality," "service," and "logic" as used herein generally represent software, firmware, hardware, or a combination of software, firmware, or hardware in conjunction with controlling the handheld device 200. As shown in FIG. 5A, the controller 202 can include a processor 204, a memory 206, and a communications interface 208.

The processor 204 provides processing functionality for at least the controller 202 and can include any number of processors, micro-controllers, circuitry, field programmable gate array (FPGA) or other processing systems, and resident or external memory for storing data, executable code, and other information accessed or generated by the controller 202. The processor 204 can execute one or more software programs embodied in a non-transitory computer readable medium that implement techniques described herein. The processor 204 is not limited by the materials from which it is formed or the processing mechanisms employed therein and, as such, can be implemented via semiconductor(s) and/or transistors (e.g., using electronic integrated circuit (IC) components), and so forth.

The memory 206 can be a tangible, computer-readable storage medium that provides storage functionality to store various data and or program code associated with operation of the controller 202, such as software programs and/or code segments, or other data to instruct the processor 204, and possibly other components of the handheld device 200/controller 202, to perform the functionality described herein. The memory 206 can store data, such as a program of instructions for operating the handheld device 200 (including its components), and so forth. It should be noted that while a single memory 206 is described, a wide variety of types and combinations of memory (e.g., tangible, non-transitory memory) can be employed. The memory 206 can be integral with the processor 204, can comprise stand-alone memory, or can be a combination of both. Some examples of the memory 206 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In embodiments, the handheld device 200 and/or the memory 206 can include removable integrated circuit card (ICC) memory, such as memory provided by a subscriber identity module (SIM) card, a universal subscriber identity module (USIM) card, a universal integrated circuit card (UICC), and so on.

The communications interface 208 can be operatively configured to communicate with components of the handheld device 200. For example, the communications interface 208 can be configured to transmit data for storage in the memory 206, retrieve data from storage in the handheld device 200, and so forth. The communications interface 208 can also be communicatively coupled with the processor 204 to facilitate data transfer between components of the handheld device 200 and the processor 204 (e.g., for communicating inputs to the processor 204 received from a device communicatively coupled with the controller 202, including, but not limited to, data received from the magnetometer 210, inertial sensor 212, and/or any other component of the handheld device 200). It should be noted that while the communications interface 208 is described as a component of controller 202, one or more components of the communications interface 208 can be implemented as components of the handheld device 200 or components communicatively coupled to the handheld device 200 via a wired and/or wireless connection.

Figure 5B:
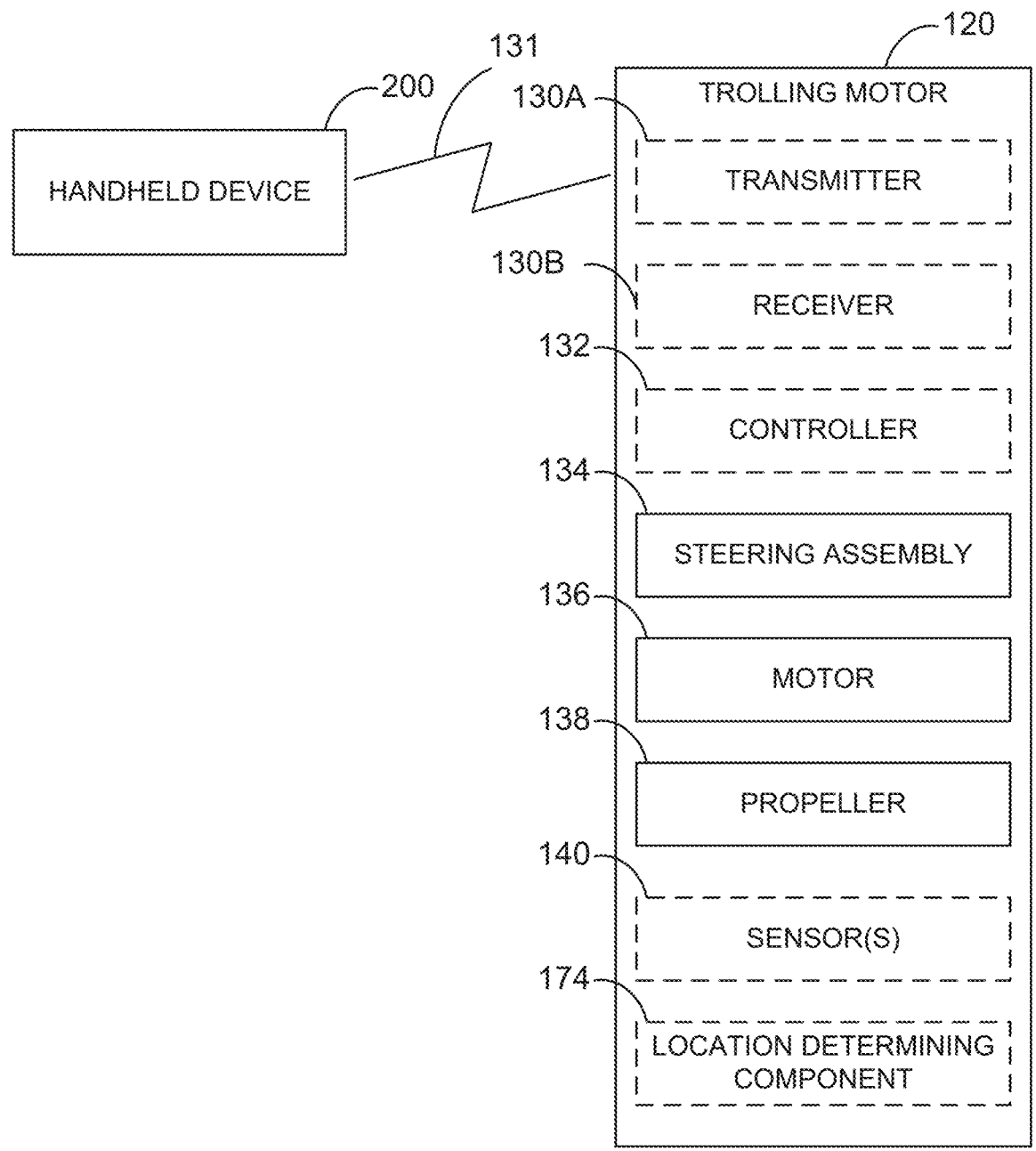
FIG. 5B is a block diagram illustrating a handheld device for navigating a marine vessel, such as the handheld device illustrated in FIG. 5A, and a trolling motor in communication with the handheld device, in accordance with an example embodiment of the present disclosure.
Figure 5C:
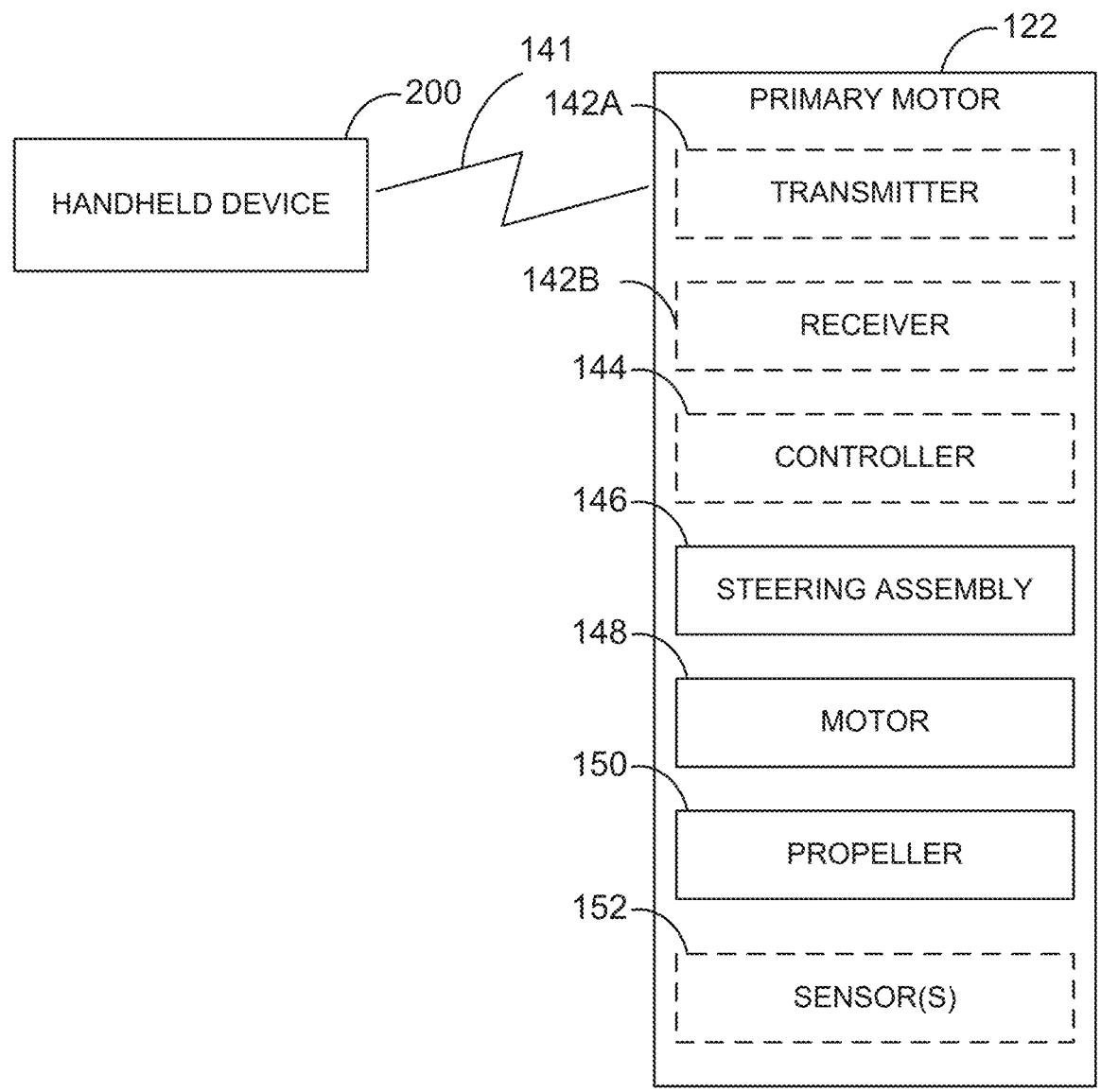
FIG. 5C is a block diagram illustrating a handheld device for navigating a marine vessel, such as the handheld device illustrated in FIG. 5A, and a primary motor in communication with the handheld device, in accordance with an example embodiment of the present disclosure.

The handheld device 200 can include a transmitter 218A and a receiver 218B. Controller 202 may control the transmitter 218A to send communications (e.g., control signals, directional and/or orientation measurements, etc.) to a motor (e.g., trolling motor 120, primary motor 122, and/or thruster 124, as shown in FIGS. 5B through 5D) or to a control system 162 that controls at least one motor (e.g., as shown in FIG. 5E). Similarly, controller 202 may utilize receiver 218B to receive communications from a motor (e.g., trolling motor 120, primary motor 122, and/or thruster 124, as shown in FIGS. 5B through 5D) or a control system 162 that controls at least one motor (e.g., as shown in FIG. 5E). For example, the receiver 218B may receive from a trolling motor 120 (or a control system 162) informational data, such as a speed of marine vessel 100, a speed of the trolling motor 120, a direction of the propulsion motor housing 170, a rotational direction of propeller 174, an operating mode (e.g., an anchor lock mode, a heading hold mode, etc.). Additionally, the receiver 218B may receive from a trolling motor 120 (or a control system 162) location information, such as GPS coordinates, determined by a location determining component of the trolling motor 120. It is to be understood that the transmitter 218A and receiver 218B can be directly or indirectly coupled (e.g., wired connection, local area network, etc.) to a motor or control system 162 or the transmitter 218A and receiver 218B can wirelessly communicate with a motor or control system 162 on the marine vessel 100.

Transmitter 218A and/or receiver 218B may establish communication wirelessly by utilizing radio frequency (RF) signals and/or data that comply with communication standards such as cellular 2G, 3G, 4G, LTE, or 5G, Institute of Electrical and Electronics Engineers (IEEE) 802.11 standard such as Wi-Fi, IEEE 802.16 standard such as WiMAX, Bluetooth™, or combinations thereof. In addition, the communication element 42 may utilize communication standards such as near field communications (NFC), ANT, ANT+, Bluetooth™ low energy (BLE), the industrial, scientific, and medical (ISM) band at 2.4 gigahertz (GHz), or the like.

The handheld device 200 can also include a user interface 220 having one or more input/output (I/O) devices, such as a display, a mouse, a touchpad, a touchscreen, a keyboard, a microphone (e.g., for voice commands) and so on. In embodiments, the handheld device 200 includes a user interface 220 configured to present information on an output device and receive user inputs from an input device. For example, the output device of the user interface 220 may include at least one output device, such as a display device 240 (e.g., a liquid crystal display (LCD), light-emitting diode (LED) display, light-emitting polymer (LEP) display, thin film transistor (TFT) display, gas plasma display, etc.), an indicator light(s), a speaker, a mechanical feedback device, or the like, for communicating information to the user. The input device of the user interface 220 can include, but is not limited to, an electromechanical input device 222 (e.g., a button, switch, toggle, trackball, or the like), a touch-sensitive input device 224 (e.g., a touchpad, touch panel, trackpad, or the like), a pressure-sensitive input device 226 (e.g., a force sensor or force-sensitive touchpad, touch panel, trackpad, button, switch, toggle, trackball, or the like), an audio input device (e.g., microphone), a camera (e.g., for detecting user gestures, or for face/object recognition), or any combination thereof.

In an embodiment, the handheld device 200 includes a ranging module 236 that is configured to emit a laser beam in the direction that the housing of the handheld device 200 is pointed, receive a reflection of the laser beam from a geographic location on the surface of the water, and determine a distance to the geographic location based on the reflected laser beam. For example, as shown in FIGS. 6A and 6B, the handheld device 200 may include a ranging module 236 that is configured to emit a laser beam that travels along path 237 in direction D towards a geographic location 201 at which the handheld device 200 is pointed in order to identify a geographic location to which the marine vessel 100 should travel or a general direction of travel for the marine vessel 100 (e.g., towards the geographic location 201). In embodiments, the path 237 of the laser beam or geographic location 201 may be illuminated to provide the user with visual feedback to assist the user in selecting a desired geographic location 201 and thereby navigating the marine vessel 100 with the handheld device 200. In some embodiments, the one or more control signals generated by the handheld device 200 are at least partially based on the determined distance of the geographic location 201 from the handheld device 200, which corresponds to the location of the marine vessel 100. For example, the controller 202 may generate one or more control signals based on the geographic location 201 that will result in operation of a motor (e.g., trolling motor 120, primary motor 122, and/or thruster 124) causing the marine vessel 100 to travel to the geographic location 201 by traveling in a direction corresponding to the directional measurement for a distance that may be determined based on an orientation measurement. The controller 202 may be configured to determine a distance to geographic location 201 based on a tilt angle $\theta_1$ of the housing of handheld device 200 relative to the horizon (distance below the horizon is labeled 'H'). As shown in FIG. 6B, the controller 202 or the magnetometer 210 may be configured to determine the directional measurement using a direction D or a directional change angle $\alpha_1$ between the direction D and a current heading 207. As further described herein, in embodiments, the controller 202 may be configured to generate the control signals for the one or more motors (e.g., trolling motor(s) 120, primary motor(s) 122, and/or thruster(s) 124) of the marine vessel 100 based on data (e.g., measurements) received from the magnetometer 210, the inertial sensor 212 (e.g., gyroscope 214 and/or accelerometer 216), the location determining component 232, a location determining component within another device (e.g., trolling motor 120) on the marine vessel 100, or a combination thereof.

The handheld device 200 may also include a location determining component 232 and an altimeter 234. The location determining component 232 may be configured to determine a position of the handheld device 200 (e.g., geographic coordinates of the handheld device 200 and/or localized coordinates of the handheld device 200 relative to the marine vessel 100). In an embodiment, the location determining component 232 is a global navigation satellite system (GNSS) receiver (e.g., a global positioning system (GPS) receiver, software defined (e.g., multi-protocol) receiver, or the like). In some embodiments, the location determining component 232 is configured to localize the handheld device 200 relative to the marine vessel 100 (e.g., determining where the handheld device 200 is located on the marine vessel 100). For example, the location determining component 232 can include a wireless receiver (similar to receiver 218B) that is configured to employ a triangulation algorithm to determine a position of the handheld device 200 relative to one or more fixed transmitters on the marine vessel 100. In some embodiments, the altimeter 234 may determine an elevation of the handheld device 200.

In some embodiments, the handheld device 200 is configured to generate and transmit one or more control signals to a trolling motor 120 and exchange communication data (e.g., measurements, user inputs, etc.) with a trolling motor 120. As shown in FIG. 5B, the trolling motor 120 may include or may be coupled with a transmitter 130A and a receiver 130B (similar in function to transmitter 218A and receiver 218B) configured to transmit or receive the signals and other communications to or from the handheld device 200 via a communications link 131 (e.g., a wired or wireless connection). For instance, transmitter 130A of the trolling motor 120 may output, and the receiver 218B of the handheld device 200 may receive from the trolling motor 120, a speed of marine vessel 100, a speed of the trolling motor 120, a direction of the propulsion motor housing 170, a rotational direction of propeller 174, and a current operating mode (e.g., an anchor lock mode, a heading hold mode, etc.). The trolling motor 120 may also include or may be coupled with a controller 132, which may include components and/or circuitry as described above with regard to controller 202. The controller 132 can be configured to control a steering assembly 134 (e.g., electromechanical steering assembly) and a motor 136 (e.g., a DC motor) that drives the propeller 138 of the trolling motor 120. The steering assembly 134 may include the shaft 172, which is fixedly mounted to both the upper housing 168 and the propulsion motor housing 170 of the trolling motor 120, and a motor enclosed within upper housing 168 that rotates the shaft 172. Propeller 138 may be attached to or a part of the propulsion motor housing 170 such that the propeller 138 is perpendicular to the direction of the propulsion motor housing 170. In embodiments, the controller 132 can be configured to change a direction of the propulsion motor housing 170 and/or change the rotational direction and/or rotational speed of the propeller 138 based on control signals received from the handheld device 200. In embodiments, controller 202 is configured to determine an adjustment to a direction of a propulsion motor housing 170 based on the directional measurement and cause transmitter 218A to transmit a control signal at least partially based on the determined adjustment. In some embodiments, the controller 132 may be configured to independently generate the control signals or a portion thereof based on communication data (e.g., measurements, user inputs, etc.) received from the handheld device 200. The trolling motor 120 may also include a location determining component 174 operable to determine a current geographic location (in a similar fashion to location determining component 232) and one or more sensors 140, such as a a speed sensor, a magnetometer, an inertial sensor, a combination thereof, or the like. Controller 132 can be configured to generate control signals at least partially based on the current geographic location and sensory data collected by the one or more sensors 140. In embodiments, controller 132 may be configured to control transmitter 130A to communicate the geographic location information and sensory data to the handheld device 200 via the communications link 131.

In some embodiments, the controller 202 of the handheld device 200 is configured to generate one or more control signals and/or configured to communication data (e.g., measurements, user inputs, etc.) to a primary motor 122. As shown in FIG. 5C, the primary motor 122 may include or may be coupled with a transmitter 142A and a receiver 142B (similar in function to transmitter 218A and receiver 218B) configured to receive the control signals and/or other communications from the handheld device 200 via a communications link 141 (e.g., a wired or wireless connection). The primary motor 122 may also include or may be coupled with a controller 144, which may include components and/or circuitry as described above with regard to controller 202. The controller 144 can be configured to control a steering assembly 146 (e.g., electromechanical steering assembly) and/or a motor 148 (e.g., an outboard motor) that drives the propeller 150 of the primary motor 122. In embodiments, the controller 144 can be configured to rotate a housing of the primary motor 122, change the rotational direction of the propeller 150, and/or change the rotational speed of the propeller 150 by controlling the steering assembly 146 and/or motor 148 based on control signals received from the handheld device 200. In some embodiments, the controller 144 is configured to independently generate the control signals or a portion thereof based on communication data (e.g., measurements, user inputs, etc.) received from the handheld device 200. The primary motor 122 may also include one or more sensors 152 (e.g., a speed sensor, magnetometer, inertial sensor, location determining component, a combination thereof, or the like), and the controller 144 can be configured to generate control signals at least partially based on sensory data collected by the one or more sensors 152 and can be configured to communicate the sensory data to the handheld device 200.

In some embodiments, the handheld device 200 is configured to generate one or more control signals and/or configured to communication data (e.g., measurements, user inputs, etc.) to a thruster 124. As shown in FIG. 5D, the thruster 124 may include or may be coupled with a transmitter 154A and a receiver 154B (similar in function to transmitter 218A and receiver 218B) configured to receive the control signals and/or other communications from the handheld device 200 via a communications link 151 (e.g., a wired or wireless connection). The thruster 124 may also include or may be coupled with a controller 156, which may include components and/or circuitry as described above with regard to controller 202. The controller 156 can be configured to control a motor 158 that drives the propeller 160 of the thruster 124. In embodiments, the controller 156 can be configured to change the rotational direction of and/or change the rotational speed of the propeller 160 by controlling the motor 158 based on control signals received from the handheld device 200. In some embodiments, the controller 156 is configured to independently generate the control signals or a portion thereof based on communication data (e.g., measurements, user inputs, etc.) received from the handheld device 200.

The handheld device 200 can be communicatively coupled to the trolling motor 120, primary motor 122, or thruster 124 as described above, or to any combination of motors on the marine vessel 100. The handheld device 200 can be communicatively coupled to the trolling motor 120, the primary motor 122, the thruster 124, or any combination thereof. In some embodiments, such as the embodiments shown in FIGS. 5B through 5D, the handheld device 200 is communicatively coupled to one or more marine vessel 100 motors (e.g., trolling motor(s) 120, primary motor(s) 122, and/or thruster(s) 124) via at least one respective communications link (e.g., link 131, link 141, and/or link 151). In other embodiments, such as the embodiment shown in FIG. 5E, the handheld device 200 is communicatively coupled to a control system 162 that is configured to control one or more marine vessel 100 motors (e.g., trolling motor(s) 120, primary motor(s) 122, and/or thruster(s) 124). For example, the control system 162 can include a controller 166, a transmitter 164A and a receiver 164B. The receiver 164B may be configured to receive the control signals and/or other communications from the handheld device 200 via a communications link 161 (e.g., a wired or wireless connection). The controller 166 is configured to control at least one of the motors (e.g., trolling motor 120, primary motor 122, and/or thruster 124) based on the control signals and/or other communications from the handheld device 200. In some embodiments, the controller 166 is configured to perform some or all of the functions/operations described above with regard to controller 132, controller 144, and/or controller 156. For example, the controller 166 may be configured to control at least one steering assembly (e.g., steering assembly 134 and/or steering assembly 146) and/or at least one motor (e.g., motor 136, motor 148, and/or motor 158) based on the control signals and/or other communications received from the handheld device 200.

The handheld device 200 is configured to control the configuration and operation of the one or more marine vessel 100 motors (e.g., trolling motor(s) 120, primary motor(s) 122, and/or thruster(s) 124) based on a current position or orientation of the handheld device 200, user movements (e.g., gestures), and/or inputs received from user interface 220. For example, as shown in FIGS. 6A and 6B, the controller 202 of the handheld device 200 may be configured to determine a directional measurement with magnetometer 210 and an orientation measurement with inertial sensor 212. The controller 202 may be configured to generate one or more control signals for the one or more motors based on the directional measurement and the orientation measurement. In embodiments, the controller 202 may control a transmitter 218A to output the directional measurement and the orientation measurement to a control system (e.g., control system 162) or a controller of at least one motor (e.g., controller 132, controller 144, and/or controller 156).

In an embodiment, the directional measurement determined by the magnetometer 210 corresponds to a direction D in which a housing of the handheld device 100 is pointed. In an embodiment, the orientation measurement determined by the inertial sensor 212 corresponds to a tilt angle $\theta_1$ of the housing of the handheld device 200 relative to a horizontal plane 205 in which the handheld device is situated (the horizontal plane may correspond to a horizon in an environment in which the user and the marine vessel 100 are located). The control signal may include a command and one or more parameters to configure one or more motors of the marine vessel 100 (e.g., trolling motor(s) 120, primary motor(s) 122, and/or thruster(s) 124) to move the marine vessel 100 on the water as desired by the user. Some exemplary commands and associated parameter are provided. The control signal may include a command to set or adjust a heading (direction) of the propulsion motor housing 170 and an associated parameter (e.g., desired heading of the propulsion motor housing 170, direction of rotation of the propulsion motor housing 170, etc.). The control signal may include a command to set or adjust a speed of the trolling motor 120 and an associated parameter (e.g., desired motor speed). The control signal may include a command to set or adjust a heading of the marine vessel 100 and an associated parameter (e.g., desired marine vessel heading). The control signal may include a command to set or adjust a speed of the marine vessel 100 and an associated parameter (e.g., desired marine vessel speed), which may be different than a desired speed of the trolling motor 120. The control signal may include a command to set or adjust a rotational direction of a propeller 138 of the trolling motor 120 and an associated parameter (e.g., clockwise rotation or counterclockwise rotation). The control signal may include a command to set or adjust a speed of the propeller 138 of trolling motor 120 and an associated parameter (e.g., 700 rpm).

In some embodiments, the controller 202 may determine a desired direction of travel based on the marine vessel 100 based on the directional measurement, such as a direction D or directional change angle $\alpha_1$. The controller 202 may determine a desired speed or travel distance based on the orientation measurement, such as the tilt angle $\theta_1$. In some implementations, the controller 202 may utilize a combination of the directional measurement (e.g., direction D, directional change angle $\alpha_1$, etc.) and the orientation measurement (e.g., tilt angle $\theta_1$) to generate one or more control signals transmitted to one or motors of the marine vessel 100 to move the marine vessel as desired. For example, the controller 202 may activate a "heading hold" operating mode to move a motor of the marine vessel 100 (e.g., trolling motor(s) 120, primary motor(s) 122, and/or thruster(s) 124) in a heading corresponding to a direction in which the handheld device 200 is pointed. The controller 202 may generate one or more control signals based on a directional measurement received from magnetometer 210 to cause a motor, such as a trolling motor 120, to set or adjust a heading (direction) of the propulsion motor housing 170 or rotate the propulsion motor housing 170 an amount determined by controller 202 and in a direction determined by controller 202. Similarly, the controller 202 may activate a "course over ground (COG) hold" operating mode to move the marine vessel 100 in a heading corresponding to a direction in which the handheld device 200 is pointed. The controller 202 may generate one or more control signals based on a directional measurement received from magnetometer 210 and geographic location information provided by the location determining component 232 to cause a motor, such as a trolling motor 120, to set or adjust a heading (direction) of the propulsion motor housing 170 or rotate the propulsion motor housing 170 an amount determined by controller 202 and in a direction determined by controller 202 to maintain a heading of the marine vessel in a desired heading after accounting for environmental factors (e.g., wind, waves, etc.).

In embodiments, the controller 202 may utilize a combination of the directional measurement (e.g., direction D, desired heading angle $\alpha_1$, etc.) and the orientation measurement (e.g., tilt angle $\theta_1$) may determine a corresponding geographic location 201 at which the handheld device 100 is pointed and generate one or more control signals that are transmitted to one or motors of the marine vessel 100 to move the marine vessel to the geographic location 201. The geographic location 201 may be any location on a body of water, such as one of a plurality of intermediate points or a selected destination for the marine vessel 100. In an embodiment, the controller 202 of the handheld device 200 is configured to navigate the marine vessel 100 as desired by the user (e.g., desired direction, speed, travel distance, etc.) or to the geographic location 201 from a current geographic location or in a direction associated with the geographic location 201 based on the directional measurement and the orientation measurement by generating control signals and/or data and then transmitting the control signals and/or data (e.g., measurement data) to a controller (e.g., controller 132, controller 144, and/or controller 156) of at least one motor or the control system 162. After receiving the control signals and/or data from the controller 202, the controller of the at least one motor or the control system 162 may configure one or more operating parameters of the motor based on the control signals and/or data received from the handheld device 200.

In implementations, where the handheld device 200 is in communication with a plurality of motors on the marine vessel 100, the control signal(s) can cause the motors to act in concert to move the marine vessel 100 as desired by the user. For example, the control signal(s) can cause one or more motors of the marine vessel 100 to be active or idle and cause each controller of the one or more motors to change an operating parameter of motor to move the marine vessel 100 in the desired direction (e.g., direction D, directional change angle $\alpha_1$, etc.), at a desired speed, or for a desired travel distance. In embodiments, the desired speed and/or travel distance may be determined based on the orientation measurement (e.g., tilt angle $\theta_1$) or a user input (e.g., a selection or an entry of a value provided via user interface 220).

As described above, the directional measurement (e.g., direction D, directional change angle $\alpha_1$, etc.) and the orientation measurement (e.g., tilt angle $\theta_1$) may correspond to a desired direction (e.g., direction D), a desired speed, a desired travel distance, or a desired geographic location 201 at which the handheld device 200 is pointed. In some embodiments, the controller 202 (or control system 162 or controller 132, 144, and/or 156) can be configured to determine a directional change angle $\alpha_1$, a distance, and a speed to move the marine vessel 100 to the geographic location 201 based on the directional measurement and the orientation measurement received from the magnetometer 210 and the inertial sensor 212, respectively. For example, an approximate elevation H of the handheld device 200 above the water 203 (distance below a horizon in the user's environment) may be predetermined and stored in memory 206, input by the user (e.g., via user interface 220), or determined based on the orientation measurement (e.g., tilt angle $\theta_1$). For example, the controller 202 can be configured to determine a direction based on the directional measurement (e.g., direction D, directional change angle $\alpha_1$, etc.) and apply algebraic principles to determine a travel distance to the geographic location 201 based on the tilt angle $\theta_1$ of the handheld device 200 and the elevation H. For example, the desired travel distance to geographic location 201 may be calculated as $d=\tan \theta_1/H$. In some implementations, the tilt angle $\theta_1$ may not be associated with a particular destination (e.g., geographic location 201) but instead the tilt angle $\theta_1$ may be associated with a desired speed of travel. For example, in an implementation shown in FIG. 6C, the orientation measurement (e.g., tilt angle $\theta_2$) can correspond to a desired speed of travel. Raising the handheld device 200 towards a vertical orientation (e.g., in a manner that increases the tilt angle $\theta_2$) can cause the controller 202 to generate one or more control signals that cause an increase in the speed of the one or more motors (e.g., trolling motor(s) 120, primary motor(s) 122, and/or thruster(s) 124). In embodiments, the controller 202 may be configured to generate one or more control signals that cause a change in the speed of the one or more motors (e.g., trolling motor(s) 120, primary motor(s) 122, and/or thruster(s) 124) in proportion to the tilt angle $\theta_2$.

In some embodiments, the controller 202 receives the directional measurement and the orientation measurement from the magnetometer 210 and the inertial sensor 212 and generates the one or more control signals in response to a user input received via user interface 220 (e.g., the one or more control signals after the user is determined to engage (pushes/presses) an input device of the user interface 220, enters a numeric value, provides a voice command, makes a motion gesture, or the like). For example, the user can point the handheld device 200 in a desired direction or at or towards a destination (e.g., geographic location 201) and interact with the user interface 220 in order to navigate the marine vessel 100 towards the geographic location 201 by providing one or more inputs to user interface 220. In other embodiments, the controller 202 receives the directional measurement and the orientation measurement and/or generates the one or more control signals in response to entry of a numeric value (e.g., a number of presses/clicks, or an entry via a touch panel, keypad, microphone (e.g., voice entry), or the like). For example, controller 202 of the handheld device 200 can be configured to cause the one or more motors (e.g., trolling motor(s) 120, primary motor(s) 122, and/or thruster(s) 124) to move the marine vessel 100 a selected distance or speed based on a numeric entry received via the user interface 220.

Figure 6C:
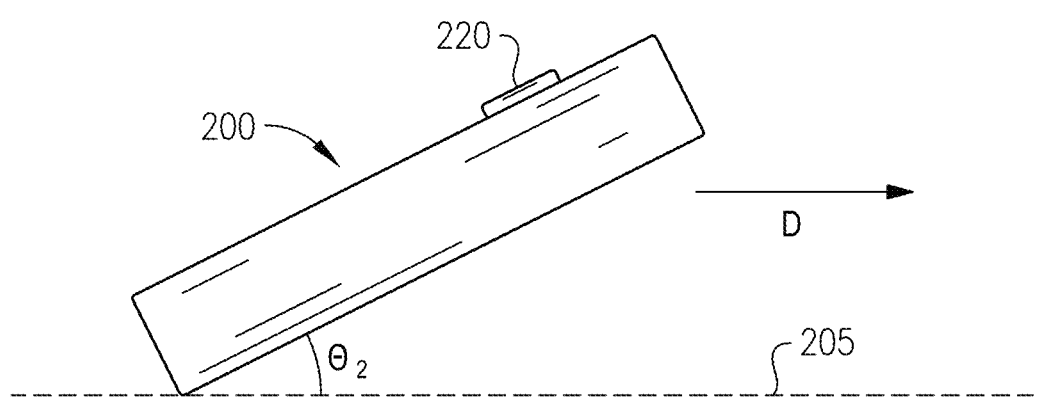
FIG. 6C illustrates a handheld device, such as the handheld device illustrated in FIG. 5A, where the handheld device is configured to navigate a marine vessel, such as the marine vessel illustrated in any of FIGS. 1 through 4B, or a combination thereof, by controlling at least one motor of the marine vessel based on a directional measurement and an orientation measurement determined while the handheld device is pointed in a direction that is a selected direction of travel and/or desired travel distance for the marine vessel, in accordance with an example embodiment of the present disclosure.
Figure 6D:
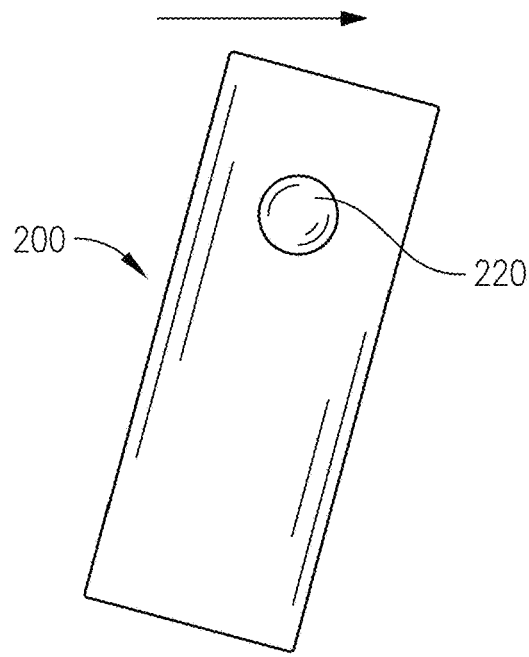
FIGS. 6D-6E illustrate a handheld device, such as the handheld device illustrated in FIG. 5A, where the handheld device is configured to navigate a marine vessel, such as the marine vessel illustrated in any of FIGS. 1 through 4B, or a combination thereof, by controlling at least one motor of the marine vessel based on a directional measurement and an orientation measurement associated with jogging the marine vessel in a first or a second direction by a predetermined or desired distance, in accordance with an example embodiment of the present disclosure.
Figure 6E:
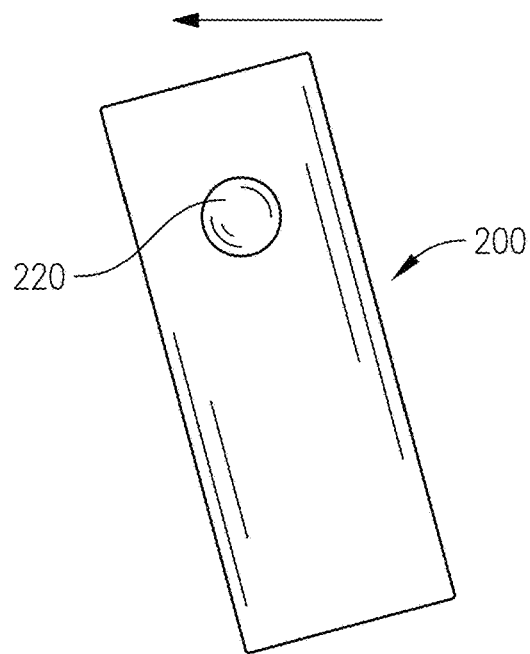

Similarly, in some implementations, the controller 202 is configured to "jog" the marine vessel 100 (cause the marine vessel 100 to move a predetermined distance stored in memory 206 or a desired distance) in a desired direction based on the directional measurement and a selection of a desired distance or the entry of a numeric value via user interface 220. For example, the selection of a desired distance or the numeric value can be determined based on a number of presses or clicks of an input device of user interface 202 associated with steering the marine vessel 100 in a desired direction (e.g., to the right or left) for a desired distance entered via user interface 220 or a predetermined distance stored in the memory 206 (e.g., 10 feet). In embodiments, the controller 202 may determine that a current operating mode of the trolling motor 120 is the anchor lock mode and that the user desires to jog the marine vessel 100 in a desired direction. The controller 202 may generate one or more control signals to deactivate the anchor lock operating mode, jog (move) the marine vessel 100 in a desired direction based on a received directional measurement and for a desired travel distance based on a selection of a predetermined value or entry of a numeric value received from user interface 220, and engagement of the anchor lock operating mode. In embodiments, the controller 202 may be configured to receive a plurality of desired jog movements from the user interface 220, store in memory 206 a directional measurement, an orientation measurement, and a selection or a numeric value associated with a desired travel distance received from user interface 220 for each of the desired jog movements, generate control signals to the one or more motors of the marine vessel 100 (e.g., trolling motor(s) 120, primary motor(s) 122, and/or thruster(s) 124) to cause the marine vessel to move as desired by the user. As shown in FIGS. 6D and 6E, controller 202 may also determine a gesture to the left or the right based on the directional measurement and the orientation measurement provided by the magnetometer 210 and the inertial sensor 212, respectively. In some embodiments, the handheld device 200 is configured to generate one or more control signals that activate the thruster 124 in addition to or instead of the trolling motor 120 and/or primary motor 122 in order to move the marine vessel 100 to the right, as shown in FIG. 6C, or to the left, as shown in FIG. 6D.

Figure 6F:
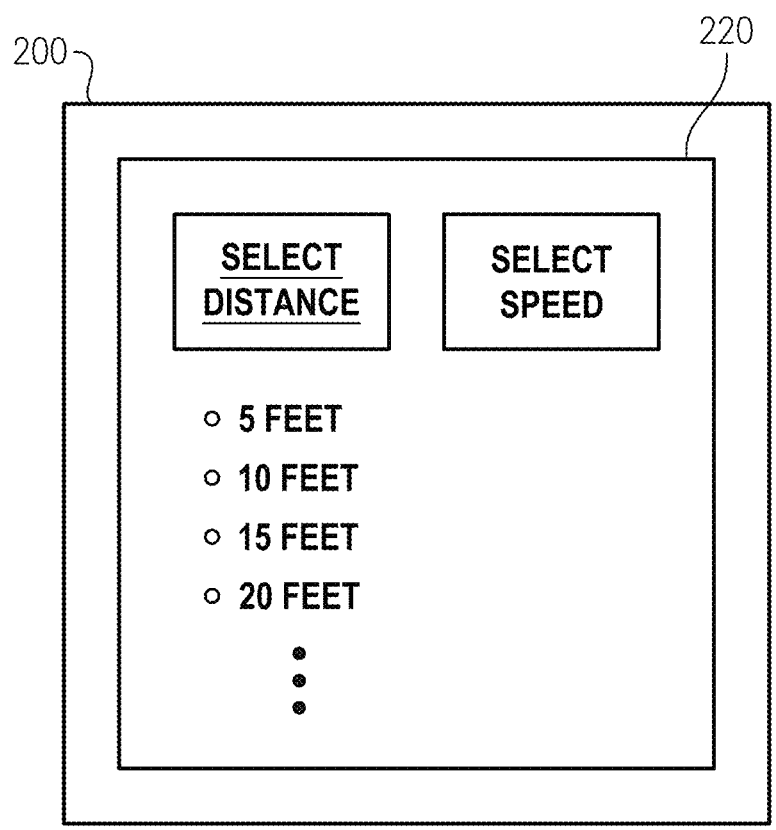
FIGS. 6F-6H illustrate a user interface of a handheld device, such as the handheld device illustrated in FIG. 5A, having a touch panel, where the handheld device is configured to navigate a marine vessel, such as the marine vessel illustrated in any of FIGS. 1 through 4B, or a combination thereof, by controlling at least one motor of the marine vessel based on a directional measurement and an orientation measurement, in accordance with example embodiments of the present disclosure.
Figure 6G:
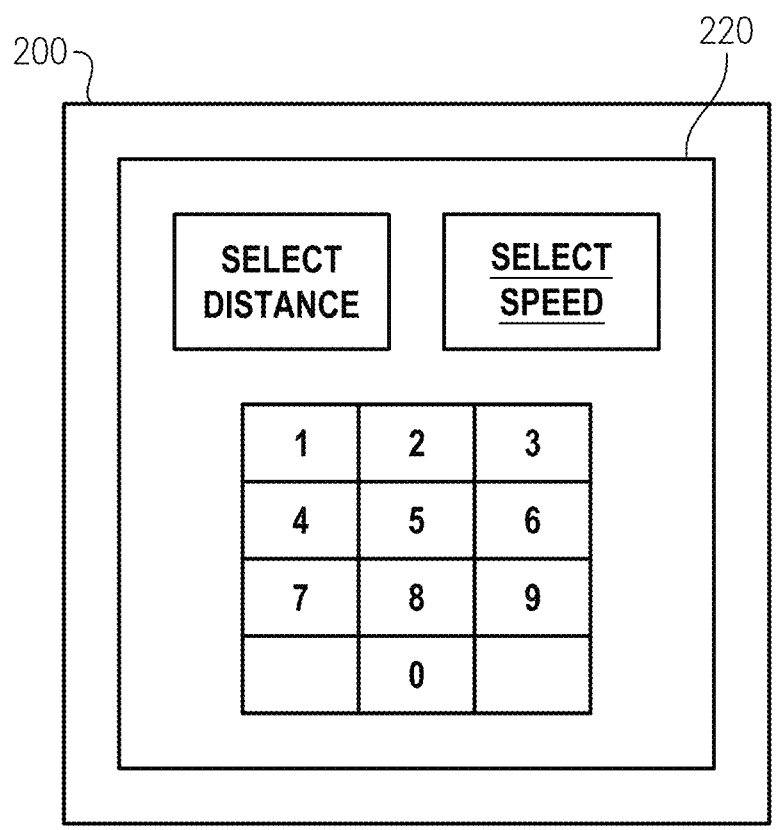

The user interface 220 of the handheld device 200 may include a display device 240 and a touch-sensitive input device 224 (e.g., a touchpad, touch panel, trackpad, or the like) that enable a user to select or enter the directional measurement, the orientation measurement, and a selection or a numeric value associated with the directional measurement or the orientation measurement. In embodiments, the user interface 220 may receive inputs from a user relating to a desired travel distance, speed, direction, or any other parameter for the controller 202 to include in the control signals transmitted to the one or more motors of the marine vessel 100. For example, as shown in FIG. 6F, the display device 240 may present a plurality of predetermined values for a parameter that may be selected by a user via touch-sensitive input device 224 of user interface 220. Alternatively, as shown in FIG. 6G, the display device 240 may present a numeric keypad enabling a user to enter a value for a parameter via touch-sensitive input device 224 of user interface 220.

Figure 6H:
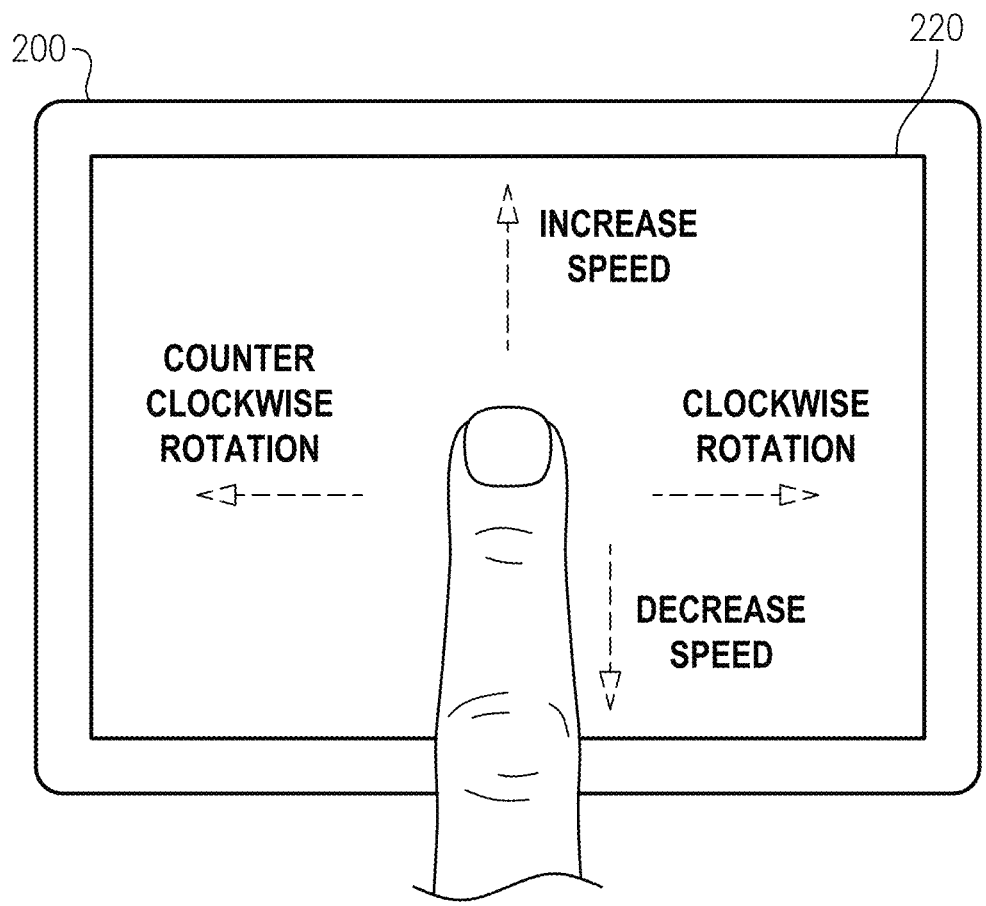

In some embodiments, as shown in FIG. 6H, the touch-sensitive input device 224 of user interface 220 may provide touch inputs, such as a swipe in the lateral direction (swipe left or swipe right), a swipe in the vertical direction (swipe up or swing down), or any combination thereof. The memory 206 may store a directional measurement and an orientation measurement associated with different swipes. For example, memory 206 may store a swipe right input and associate the input with a directional measurement, such as a predetermined directional change angle $\alpha_1$ (e.g., +45 degrees, +90 degrees, etc.), a clockwise rotation of the one or more motors (e.g., trolling motor 120) or a clockwise rotational direction of the propeller 138. Similarly, memory 206 may store a swipe left input and associate the input with a directional measurement, such as a predetermined directional change angle $\alpha$ (e.g., −45 degrees, −90 degrees, etc.), a counter-clockwise rotation of the one or more motors (e.g., trolling motor 120), or a counter-clockwise rotational direction of the propeller 138. The memory 206 may store a swipe up input and associate the input with an orientation measurement, such as a tilt angle $\theta$ (+5 degrees, +10 degrees, etc.), an increase in speed of the marine vessel 100 (travel velocity), or an increase in speed of the one or more motors (e.g., trolling motor 120). Similarly, the memory 206 may store a swipe down input and associate the input with an orientation measurement, such as a tilt angle $\theta$ (−5 degrees, −10 degrees, etc.), a decrease in speed of the marine vessel 100 (travel velocity), or a decrease in speed of the one or more motors (e.g., trolling motor 120).

It is to be understood that the above-described functionality implemented by controller 202 and user interface 220 may be implemented on a display for a marine vessel display system having a user interface (e.g., push buttons, touch panel, etc.) and a wired or wireless transmitter configured to communicate the one or more control signals and data to external sources including the one or more motors (e.g., trolling motor(s) 120, primary motor(s) 122, and/or thruster(s) 124).

In some embodiments, the controller 202 may be configured to generate the one or more control signals based at least in part on a location of the handheld device 200 relative to the marine vessel 100. For example, the handheld device 200 may be configured to determine its location or the geographic location of the marine vessel 100 based on information received from the location determining component 232 or the location determining component 174. The controller 202 may be configured to use its location or the location of the marine vessel 100 to navigate the marine vessel 100 in a selected or determined direction, for a selected or determined distance, at a selected or determined speed as desired by the user or towards a desired location (e.g., geographic location 201) based on the directional measurement and the orientation measurement received from the magnetometer 210 and the inertial sensor 212, respectively.

As described herein, the handheld device 200 can be configured to operate with a single motor. For example, the handheld device 200 and the trolling motor 120 can be a system, or the handheld device 200 and the primary motor 122 can be a system. In other embodiments, the system can include a plurality of motors (e.g., two or more trolling motors 120, two or more primary motors 122, or a combination of motors (e.g., trolling motor(s) 120, primary motor(s) 122, and/or thruster(s) 124) that are configured to communicate with the handheld device via respective communication links (e.g., link 131, link 141, and/or link 151) or indirectly (e.g., via control system 162), or a combination thereof. As shown in FIGS. 7A through 7D, the handheld device 200 may also be configured to communication with a marine vessel display system 300, which includes a display device. For example, the handheld device 200 and/or control system 162 can be communicatively coupled (e.g., wired or wirelessly connected) to the marine vessel display system 300. The marine vessel display system 300 may be mounted in a marine vessel 100 (e.g., boat, ship, sailboat, or other watercraft), as shown in FIG. 7C. The marine vessel display system 300 may assist operators of the marine vessel 100 in monitoring information related to the operation of the marine vessel 100. As utilized herein, the term operator may mean any user of the marine vessel display system 300. For example, an operator may be an owner of the marine vessel 100, a crew member, a pilot, a passenger, and so forth.

Figure 7A:
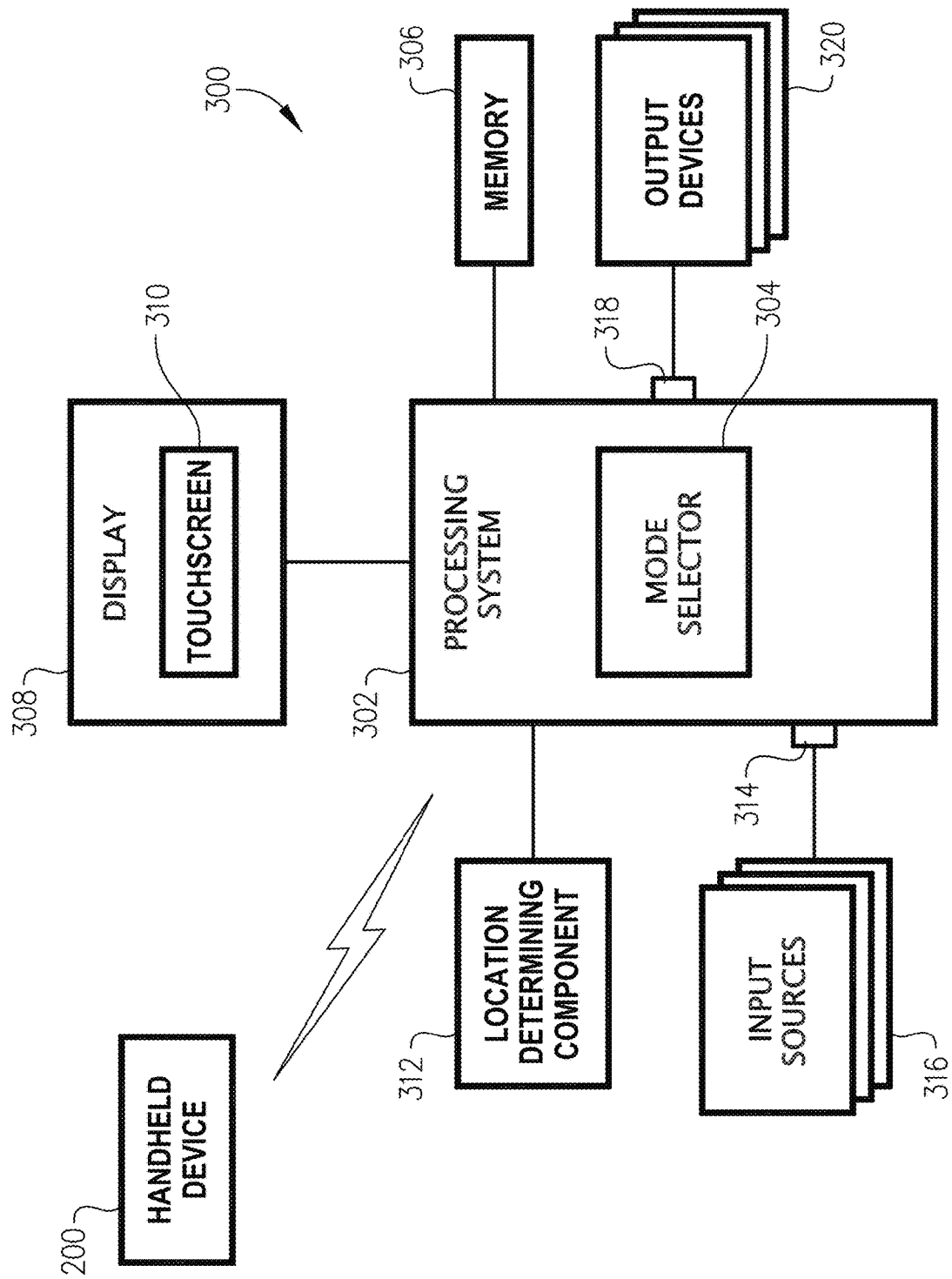
FIG. 7A is a block diagram of a marine vessel display system that can be in communication with a handheld device, such as the handheld device illustrated in FIG. 5A, in accordance with an example embodiment of the present disclosure.
Figure 7B:
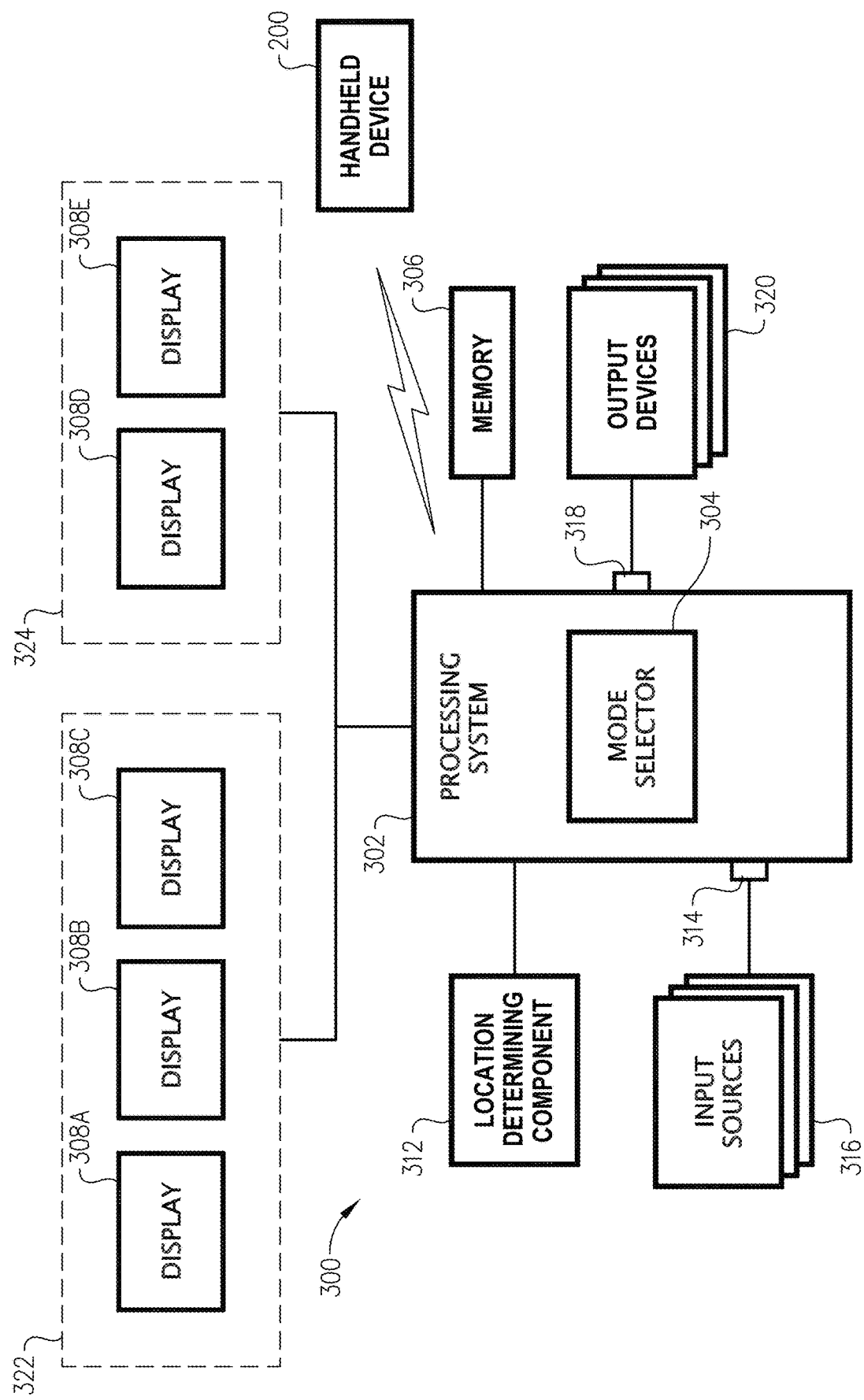
FIG. 7B is a block diagram of a marine vessel display system that can be in communication with a handheld device, such as the handheld device illustrated in FIG. 5A, where the marine vessel display system includes multiple displays and/or display stations, in accordance with an example embodiment of the present disclosure.

As shown in FIGS. 7A and 7B, the marine vessel display system 300 can include at least one input 314 for receiving data from one or more marine input sources 316; a display 308 for presenting information representative of at least some of the data from the marine input sources 316; and a processing system 302 in communication with the inputs 314 and the display 308. As described in more detail below, the processing system 302 may implement a plurality of modes of operation, each of which may cause the display 308 to present information representative of data from predetermined ones of the marine input sources 316 and in selected formats. The marine vessel display system 300 may further comprise a location determining component 312 that furnishes geographic position data for the marine vessel 100 (similar in function to location determining components 232, 174). The processing system 302 may implement a mode selector 304 configured to select between a plurality of modes of operation, respective ones of which present information representative of data from selected marine input sources 316 on the display 308. The processing system 302 may further be configured to cause at least one of automatic activation or deactivation of an equipment of the marine vessel (e.g., turn on a fish finder, start a trolling motor, activate an anchor system, start or shut down the engines of the marine vessel, activate a navigation system, etc.) during selection of a particular mode of operation. In an embodiment, the processing system 302 is coupled to and/or includes the control system 162 that is configured to control the one or more motors (e.g., trolling motor(s) 120, primary motor(s) 122, and/or thruster(s) 124) of the marine vessel 100.

The input 314 may be any wireless or wired device or devices for receiving data from the marine input sources 316 and transferring the data to the processing system 302. The input 314 may comprise, for example, one or more Ethernet ports, Universal Serial Bus (USB) Ports, High Definition Multi-Media Interface (HDMI) ports, memory card slots, video ports, radio frequency (RF) receivers, infrared (IR) receivers, Wi-Fi receivers, Bluetooth devices, and so forth.

The marine input sources 316 may provide data to the processing system 302 and may comprise any measurement devices, sensors, receivers, or other components that sense, measure, or otherwise monitor components of the marine vessel 100 or its surroundings. For example, the marine input sources 316 may include sensors that measure or sense vessel fuel level, wind speed, wind direction, vessel temperature, ambient temperature, water current speed, rudder position, an azimuth thruster position, water depth, boat water storage level, anchor status, boat speed, combinations thereof, and the like. In an embodiment (e.g., as shown in FIG. 7C), a marine input source 316 includes an integrated or external sonar sounder including a sonar transducer. In some embodiments, the marine input sources 316 can also include an integrated or external radar scanner or other proximity sensor. In an embodiment, the handheld device 200 is configured to communicate a selected location (e.g., geographic location 201) to the processing system 302 based on the directional measurement (e.g., direction D, directional change angle $\alpha_1$, etc.), orientation measurement (e.g., tilt angle $\theta_1$), and/or additional sensory data (e.g., elevation, position of handheld device, etc.), where the processing system 302 is in turn configured to detect sonar/radar data associated with the selected location (e.g., geographic location 201). In some embodiments, the selected location (e.g., geographic location 201) can be displayed as a cursor on a map or chart (e.g., sonar/radar plot) that is presented via display 308.

The marine input sources 316 may also include transmitters, receivers, transceivers, and other devices that receive data from external sources. It is to be understood that a transmitter and a receiver of the marine vessel display system 300 can be directly or indirectly coupled (e.g., wired connection, local area network, etc.) to the one or more motors (e.g., trolling motor(s) 120, primary motor(s) 122, and/or thruster(s) 124) of the marine vessel 100 or a control system or the transmitter and the receiver of the marine vessel display system 300 can wirelessly communicate with to the one or more motors (e.g., trolling motor(s) 120, primary motor(s) 122, and/or thruster(s) 124) of the marine vessel 100 or a control system. For example, the marine input sources 316 may include an integrated or external weather receiver for receiving weather data from a weather source, a satellite entertainment system receiver for receiving entertainment content broadcast via satellite, and/or a global positioning system (GPS) receiver or other satellite navigation receiver for receiving navigation signals.

The marine input sources 316 may also comprise a receiver or other device for communicating with transmitters or other devices worn by crew and/or passengers (hereinafter "wearable transmitter") on the marine vessel 100. For example, crew and passengers of the marine vessel 100 may be provided with a wearable transmitter configured to warn of "man overboard" emergencies. Such a wearable transmitter may detect when the wearer is no longer on the marine vessel 100, for example, by sensing the presence of water or by comparing the current geographic position of the wearer to the current geographic position of the marine vessel 100, and may thereafter provide a transmission to cause the marine vessel display system 300 to enter a man overboard mode of operation and to aid in the recovery of the wearer (e.g., by providing the GPS position of the wearer, a locating beacon, or the like). Similarly, crew and passengers of the marine vessel 100 may be provided with a wearable transmitter that is configured to provide a transmission when the wearable transmitter, or an associated medical monitoring device, detects that the wearer is experiencing a medical emergency or health issue. The transmission may cause the marine vessel display system 300 to initiate an automated communication requesting assistance (e.g., an S.O.S. radio transmission), initiate an autopilot mode of operation, or the like. Still further, crew and passengers of the marine vessel 100 may be provided with a wearable transmitter that is configured to provide radio communication between the wearer and an operator of the marine vessel display system 300. In embodiments, a wearable transmitter may be provided that is capable of furnishing multiple functions such as those described herein above.

The marine input sources 316 may also comprise a security system for monitoring, ports, doors, windows, and other parts of the marine vessel 100 against unauthorized access and one or more cameras for providing video and/or other images of the marine vessel 100 and/or surroundings of the marine vessel 100.

The marine input sources 316 may comprise one or more computers and/or handheld electronic devices (e.g., handheld device 200) that may be used to transfer data to the marine vessel display system 300. The marine input sources 316 may be integrally formed with the marine vessel display system 300, may be stand-alone devices, or may be a combination of both. For example, a sonar sounder may be integrated into the marine vessel display system 300 or may be an external sonar sounder module. Similarly, a radar scanner may be integrated into the marine vessel display system 300 or be an external device. The marine input sources 316 may be operated and/or adjusted using controls on the marine vessel display system 300 or may have their own controls.

Figure 7D:
FIG. 7D is a perspective view of a display for a marine vessel display system, such as the marine vessel display system illustrated in FIG. 7A and/or FIG. 7B, in accordance with an example embodiment of the present disclosure.
Figure 7C:
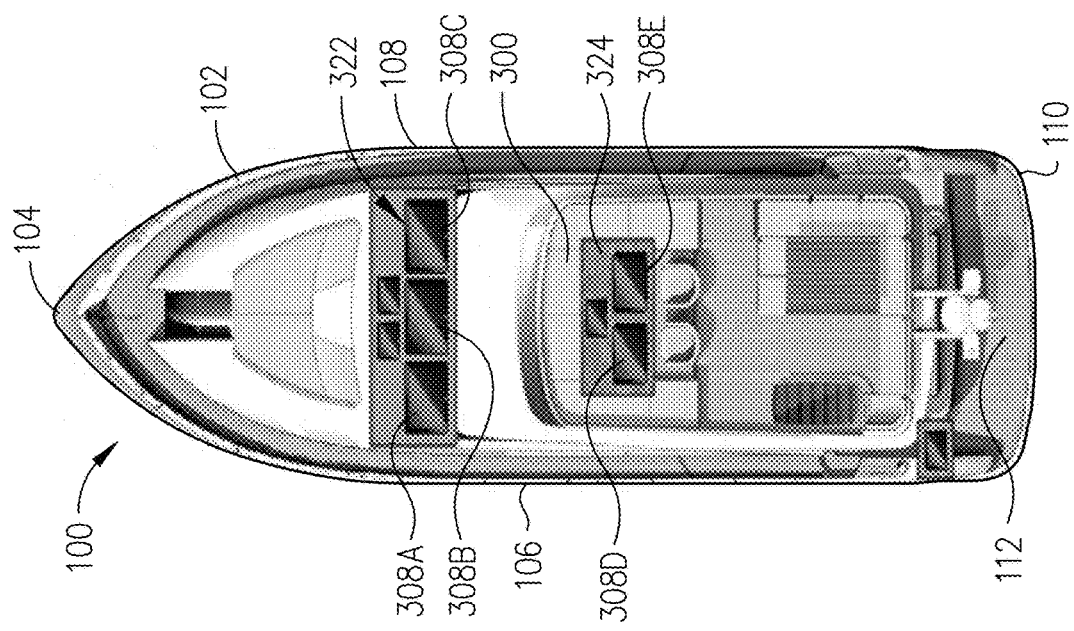
FIG. 7C is a top view of a marine vessel that can employ a marine vessel display system, such as the marine vessel display system illustrated in FIG. 7A and/or FIG. 7B, in accordance with an example embodiment of the present disclosure.

The display 308 may be communicatively coupled with the processing system 302 and may be configured for displaying text, data, graphics, images and other information representative of data from the marine input sources 316 and/or other sources. An example embodiment of the display 308 is shown in FIG. 7D. The display 308 may be a liquid crystal display (LCD), light-emitting diode (LED) display, light-emitting polymer (LEP) display, thin film transistor (TFT) display, gas plasma display, or any other type of display. The display 308 may be backlit such that it may be viewed in the dark or other low-light environments. The display 308 may be of any size and/or aspect ratio, and in one or more embodiments, may be 15 inches, 17 inches, 19 inches, or 24 inches (measured diagonally). In some embodiments, the display 308 may include a touchscreen display 310. The touchscreen display 310 may employ any touchscreen technology, including, but not limited to, resistive, capacitive, or infrared touchscreen technologies, or any combination thereof.

The processing system 302 may control the presentation of information on the display 308, may perform other functions described herein, and can be implemented in hardware, software, firmware, or a combination thereof. The processing system 302 may include any number of processors, controllers, microprocessors, microcontrollers, programmable logic controllers (PLCs), field-programmable gate arrays (FPGAs), application specific integrated circuits (ASICs), or any other component or components that are operable to perform, or assist in the performance of, the operations described herein.

The processing system 302 may also be communicatively coupled to or include memory 306 for storing instructions or data. The memory 306 may be a single component or may be a combination of components that provide the requisite storage functionality. The memory 306 may include various types of volatile or non-volatile memory such as flash memory, optical discs, magnetic storage devices, SRAM, DRAM, or other memory devices capable of storing data and instructions. The memory 306 may communicate directly with the processing system 302, or may communicate over a data bus or other mechanism that facilitates direct or indirect communication. The memory 306 may optionally be structured with a file system to provide organized access to data existing thereon.

The memory 306 may store one or more databases that may include information about the marine vessel 100 in which the marine vessel display system 300 is used, such as the length, width, weight, turning radius, top speed, draft, minimum depth clearance, minimum height clearance, water capacity, fuel capacity and/or fuel consumption rate of the marine vessel 100. The databases may also store information related to the locations and types of navigational aids including buoys, markers, lights, or the like. In some embodiments, the information related to navigational aids may be provided by the Coast Guard or other map data sources.

The processing system 302 may implement one or more computer programs that provide the modes of operation described below, that control the display of information on the display 308 as described herein, and/or that cause automatic activation or deactivation of an equipment of the marine vessel during selection of the first mode of operation. The computer programs may comprise ordered listings of executable instructions for implementing logical functions in the processing system 302. The computer programs can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can contain, store, communicate, propagate or transport the program for use by or in connection with the processing system 302 or other instruction execution system, apparatus, or device. The computer-readable medium can be, for example, but not limited to, an electronic, magnetic, optical, electro-magnetic, infrared, or semi-conductor system, apparatus, device, or propagation medium. More specifically, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

In accordance with the present disclosure, the processing system 302 may implement a plurality of modes of operation, each of which may present information representative of data from selected marine input sources 316 via the display 308. In some embodiments, the information may be presented in a desired format to minimize confusion and increase ease of use. For example, the processing system 302 may implement a pre-trip planning mode in which information representative of trip planning data is presented on the display 308. The trip planning data may be uploaded, transmitted, or otherwise communicated to the marine vessel display system 300 from one or more marine input sources 316 and may include route planning data; waypoint data;

journey plans; forecasted wind, current, storm, and/or tidal conditions; vessel fuel requirements; vessel water requirements; and other data that may be useful to an operator while planning a journey. The pre-trip planning mode may permit an operator to create a journey plan or similar plan on a remote or local computer and then transfer information related to the plan to the marine vessel display system 300 so it can be presented on the display 308 and accessed by the operator while operating the marine vessel 100.

The processing system 302 may also implement a boat preparation mode in which information representative of water storage data, fuel level data, hatch status data and/or other boat readiness data is presented on the display 308. The boat preparation mode may provide information related to a boat's readiness for use.

The processing system 302 may also implement a close quarters mode in which information representative of proximity data and navigation data is presented on the display 308. The close quarters mode may be particularly useful when navigating in a harbor or other confined area when an operator needs to be aware of his or her vessel's location relative to other vessels and obstacles. The close quarters mode may also present information from a pilot book, local speed limits, rules, regulations, and so forth, on the display 308.

The processing system 302 may also implement a docking/undocking mode in which information representative of proximity data from a proximity sensor, wind data from a wind sensor, water current data from a current sensor, rudder position data from a rudder position sensor, and/or azimuth thruster position data from an azimuth thruster position sensor is presented on the display 308. The docking/undocking mode permits an operator to view representations of obstacles such as stationary boats, docks, and other hazards while simultaneously monitoring wind conditions, current conditions, and the status of components on the vessel while docking or undocking the vessel.

The processing system 302 may also implement a main transit mode in which information representative of fuel level data, navigation data, water depth data, and/or weather data is presented on the display 308. A feature of the main transit mode may be monitoring the progress of the marine vessel 100 against a journey plan. For example, the processing system 302 may compare information related to a desired path of transit with the current position of the marine vessel 100 received from the location determining component 312 while the marine vessel 100 is in transit to determine if the marine vessel 100 is off course, has enough fuel to reach its intended destination, and so forth, and may then display such information on the display 308. The main transit mode may also present information representative of nearby vessels, obstacles, and so forth.

The processing system 302 may also implement an anchoring mode in which information representative of the anchor status data, wind data, depth data, tide data, proximity data, and/or navigation is presented on the display 308. The anchoring mode may permit an operator to find suitable locations to anchor the marine vessel 100, and alert the operator if the anchor is dragging and/or if the marine vessel 100 is moving when it should not be.

The processing system 302 may also implement an off-boat monitoring mode in which information representative of security data, anchor status data, wind data, and/or weather data is presented on the display 308. In some embodiments, the marine vessel display system 300 may send texts, images, and so forth, to a remote device, such as an operator's mobile telephone or a computer, via a cellular telephone connection, radio frequency transmitter, the Internet, and so forth, so that the operator may monitor the marine vessel 100 remotely.

The processing system 302 may also implement a fishing mode in which information representative of fish finder data, water temperature data, navigation data, and/or proximity data is presented on the display 308. The fishing mode may allow an operator to view representations of fish, other boats, and hazards while fishing and to monitor water conditions to determine if they are conducive to fishing.

The processing system 302 may also implement a boat storage and transport mode in which information representative of photographic data, navigation data, and/or proximity data is presented on the display 308. As with the off-boat monitoring mode, the processing system 302 may display such information on the display 308 and/or transmit it to a remote device.

The processing system 302 may also implement a man overboard mode in which information representative of passenger location data and/or navigation data is presented on the display 308. The man overboard mode may display an alert and/or sound an alarm when any of the location devices worn by passengers indicate that a passenger is outside of a threshold distance from the marine vessel 100 and may have fallen overboard. The man overboard mode may also record and display the last known coordinates for the passenger when he or she left the marine vessel 100 and may automatically send such data to a marine rescue authority such as the United States Coast Guard or the like.

The processing system 302 may also implement a hazard hit mode in which information representative of bilge water level data is presented on the display 308. The hazard hit mode may allow an operator to quickly determine if the marine vessel 100 is taking on water and, if so, the rate at which the marine vessel 100 is taking on water. The hazard hit mode may also determine if a bilge pump can remove the water quickly enough to keep the marine vessel 100 afloat or if the marine vessel 100 should be abandoned. The hazard hit mode may also alert authorities such as the United States Coast Guard, or the like, of the position and status of the marine vessel 100.

The above-described modes of operation are only examples of modes that may be implemented by the processing system 302. Other modes of operation, or combinations or portions of the above-described modes, may also be implemented without departing from the scope of the invention.

In addition to displaying information from one or more selected marine input sources 316, each mode of operation may present information in a particular operator-selected or otherwise predetermined format. For example, some of the information may be presented in the form of one or more virtual devices that mimic the appearance and/or function of a gauge, instrument, or other analog device. Each virtual device may have a unique collection of graphical and functional properties that may be configured by a layout designer and/or adjusted by an operator. Examples of virtual devices that may be presented with the marine vessel display system 300 include a chartplotter, a radar screen, a fishfinder, a camera/video screen, digital instruments with numbers, analog instrument gauges, autopilot interfaces, and entertainment interfaces. In some embodiments, the display format may change based on a current operating mode. For example, if the selected mode of operation from a first mode of operation, such as a main transit mode of operation, to a second mode of operation, such as a docking/undocking, anchoring, or fishing mode of operation or other modes of operation, the display format may change accordingly to accommodate features relevant to the selected mode of operation.

The processing system 302 may further be configured to cause automatic activation or deactivation of various equipment of the marine vessel during selection of particular modes of operation. In embodiments, equipment of the marine vessel 100 for which use may be expected or possible during the time a mode of operation is selected may be associated with that mode of operation. The processing system 302 may then automatically activate such equipment when the mode of operation is selected. Similarly, the processing system 302 may automatically deactivate other equipment that is no longer expected to be used while the mode of operation is selected. For example, when a fishing mode is selected the processing system 302, the processing system 302 may issue a command to shut down or idle the marine vessel's engine, start a trolling motor, and/or turn on a fish finder. Similarly, when a hazard hit mode is initiated, the processing system 302 may automatically cause a bilge pump to be turned on, and/or may automatically tune a marine radio to alert authorities such as the United States Coast Guard, or the like, of the position and status of the marine vessel 100 (e.g., transmit an S.O.S. call). In embodiments, the processing system 302 may be configured to cause the automatic activation or deactivation of one or more output devices 320 via an output 318 when a particular mode of operation is selected, as described below.

The location determining component 312 may be configured to provide location-determining functionality for the marine vessel display system 300 and, optionally, the marine input sources 316 and/or other system and components employed by the marine vessel 100. Location-determining functionality, for purposes of the following discussion, may relate to a variety of different navigation techniques and other techniques that may be supported by "knowing" one or more locations. For instance, location-determining functionality may be employed to provide location data, timing data, speed data, and/or a variety of other navigation-related data.

In implementations, the location determining component 312 may comprise a receiver that is configured to receive signals from one or more position-transmitting sources. For example, the location determining component 312 may be configured for use with a Global Navigation Satellite system (GNSS). In embodiments, the location determining component 312 may be a global positioning system (GPS) receiver operable to receive navigational signals from GPS satellites and to calculate a location of the marine vessel 100 as a function of the signals.

While a GPS system is described herein, it is contemplated that a wide variety of other positioning systems may also be used, such as terrestrial based systems (e.g., wireless-telephony systems or data systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros or odometers), and so on. Other example systems include, but are not limited to, a Global Orbiting Navigation Satellite System (GLONASS), a Galileo navigation system, or other satellite navigation system.

The output 318 may be any wired or wireless port, transceiver, memory slot, or other device for transferring data or other information from the processing system 302 to the output devices 320. The output devices 320 may be any devices capable of receiving information from the processing system 302 or being controlled by the marine vessel display system 300 such as a marine radio, beacon, lighting system, and so forth. In embodiments, the processing system 302 may be configured to cause at least one of automatic activation or deactivation of the output devices 320 via the output 318. For example, the processing system 302 may automatically tune a channel on a marine radio, activate or deactivate a beacon, turn a lighting system on or off, or the like, during selection of various modes of operation.

The marine vessel display system 300 may also include a speaker for providing audible instructions and feedback, a microphone for receiving voice commands, an infrared port for wirelessly receiving and transmitting data and other information from and to nearby electronics, and other information, and a cellular or other radio transceiver for wirelessly receiving and transmitting data from and to remote devices.

In addition to the input 314 and output 318, the marine vessel display system 300 may also include a number of other Input/Output (I/O) ports that permit data and other information to be communicated to and from the processing system 302. The I/O ports may include one or more removable memory card slots, such as a micro SD card slot, or the like for receiving removable memory cards, such as microSD cards, or the like, and/or an Ethernet port for coupling a processing system 302 to another processing system such as a personal computer. Databases of geographic areas cross-referenced with modes of operation, navigational software, cartographic maps and other data and information may be loaded in the marine vessel display system 300 via the I/O ports, the wireless transceivers, or the infrared port mentioned above. The data may be stored in memory 306 of processing system 302. In some embodiments, stored cartographic maps may be upgraded, downgraded, or otherwise modified in the background without interfering with the primary uses of the marine vessel display system 300. If multiple processing systems 302 are employed by the marine vessel display system 300, the upgrade, downgrade, or modification may be applied to all processing systems 202. Thus, for example, the various components of the marine vessel display system 300 may be easily upgraded, downgraded, or modified without manually and tediously installing the same data on each of the components. Such functionality may also facilitate data uniformity among the various components of the marine vessel display system 300.

The marine vessel display system 300 may further include at least one housing that encloses and protects the other components of the marine vessel display system 300 from the environment (e.g., moisture, contaminants, vibration, impact, etc.). The housing may include mounting hardware for removably securing the marine vessel display system 300 to a surface within the marine vessel 100 or may be configured to be panel-mounted within the marine vessel 100. The housing may be constructed from a suitable lightweight and impact-resistant material such as, for example, plastic, nylon, aluminums, composites, steels, or any combination thereof. The housing may include appropriate gaskets or seals to make it substantially waterproof or water resistant. The housing may take any suitable shape or size, and the particular size, weight and configuration of the housing may be changed without departing from the scope of the present disclosure.

FIG. 7B illustrates an embodiment of the marine vessel display system 300, where the marine vessel display system 300 employs a plurality of independent displays (e.g., displays 308A through 308E). Two or more of the displays (e.g., displays 308A through 308E) may be mounted proximate (e.g., adjacent) to one another to form one or more display stations in the marine vessel 100. For example, as illustrated in FIGS. 7B and 7C, three displays 308A, 308B, 308C may be mounted together to form a first display station 322 in a first area of the marine vessel 100, and two other displays 308D, 308E may be mounted together to form a second display station 324 in a second area of the marine vessel 100. The marine vessel display system 300 may also include additional displays 308 grouped into one or more additional display stations. The embodiments described herein and shown in the figures are example implementations of the technology; however, it is contemplated that any number of displays and/or display stations can be employed by the marine vessel display system 300 without departing from the scope of this disclosure. Furthermore, the processing system 302 may be any configuration of processors that enables communication with one or more displays (e.g., displays 308A through 308E). In some embodiments, each display 308 and/or display station 322 or 324 may have a separate processing system 302, or one processing system 302 may control all displays 308 of both display stations 322 and 324 and any other display stations, or any combination thereof (e.g., some displays 308 have respective separate processing systems 302 and some displays 308 have shared processing systems 302). In embodiments including multiple processing systems 302 for respective displays 308 and/or display stations 322 or 324, the processing systems 302 may coordinate their activities with other processing systems 302 of the marine vessel display system 300. The processing system 302 may include any number of processors, micro-controllers, or other processing systems and resident or external memory for storing data and other information accessed or generated by the marine vessel display system 300.

Figure 8:
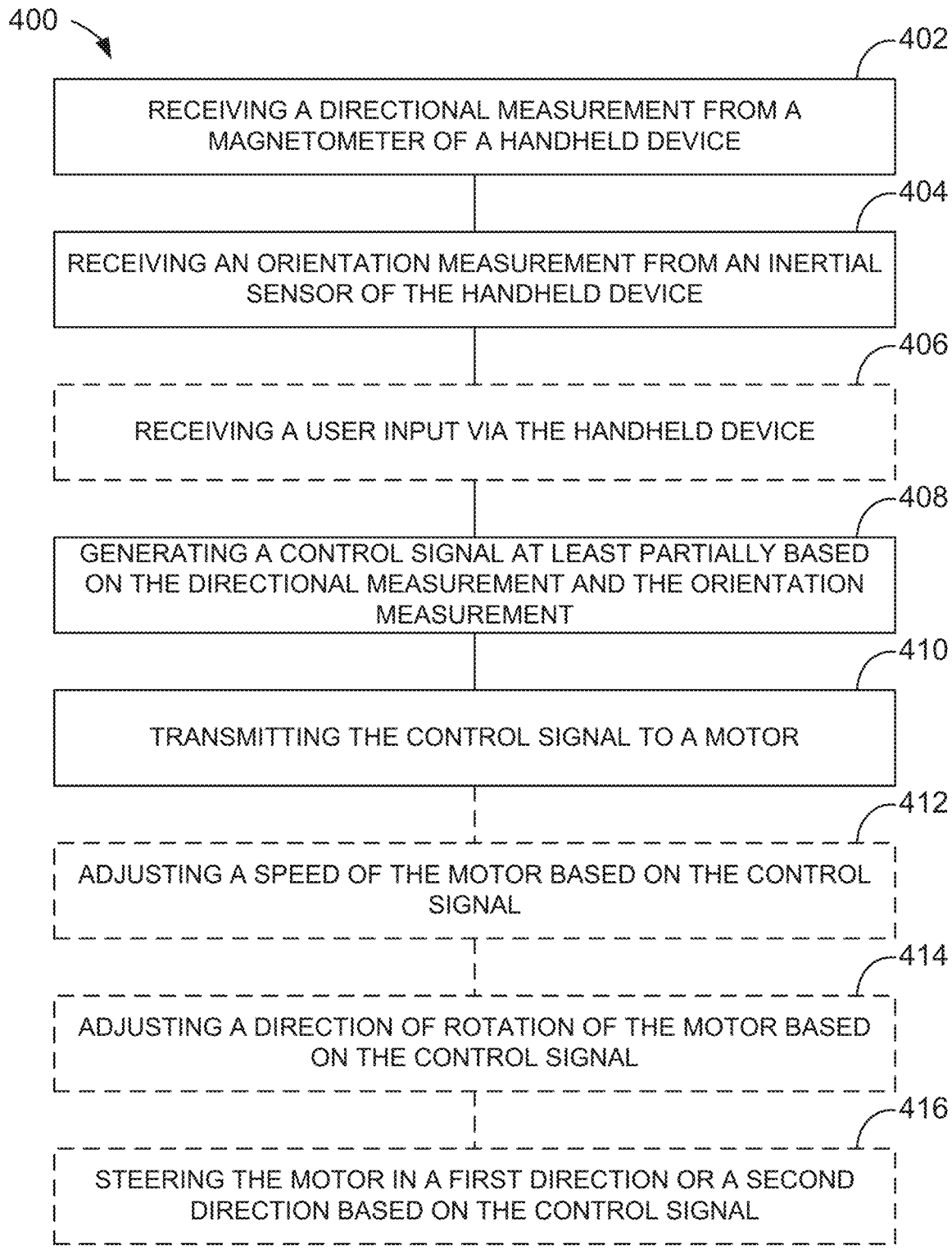
FIG. 8 is a flow diagram illustrating a process for navigating a marine vessel, such as the marine vessel illustrated in any of FIGS. 1 through 4B, or a combination thereof, by employing a handheld device, such as the handheld device illustrated in FIGS. 5A through 6D, to control at least one motor (e.g., at least one trolling motor, primary motor, and/or thruster) of the marine vessel, in accordance with an example implementation of the present disclosure.

FIG. 8 illustrates an example process 400 that employs a handheld device 200 for navigating a marine vessel (e.g., marine vessel 100) through the water. In general, operations of disclosed processes (e.g., process 400) may be performed in an arbitrary order, unless otherwise provided in the claims. The handheld device 200 can be communicatively coupled to at least one motor of a marine vessel. For example, in an implementation, the handheld device 200 is communicatively coupled to the trolling motor 120, primary motor 122, and/or thruster 124 of the marine vessel 100. The handheld device 200 may be directly coupled to the trolling motor 120, primary motor 122, and/or thruster 124 via a wired or wireless communication link (e.g., link 131, 141, and/or 151). Alternatively, the handheld device 200 may be communicatively coupled to a control system 162 that controls the trolling motor 120, primary motor 122, and/or thruster 124 based on control signals and/or data received from the handheld device 200.

In an implementation of the process 400, the handheld device 200 detects a directional measurement with a magnetometer (e.g., magnetometer 210) of the handheld device 200 (block 402). For example, the handheld device 200 detects a direction D in which the handheld device 200 is pointed. The handheld device 200 additionally or alternatively detects an orientation measurement with an inertial sensor (e.g., inertial sensor 212) of the handheld device (block 404). For example, the handheld device 200 detects a tilt angle $\theta_1$ or $\theta_2$ of the handheld device 200. The handheld device 200 can generate control signals or data based on the detected directional measurement and/or orientation measurement (block 408).

In some implementations, the handheld device 200 generates the control signals or data in response to receiving a user input (block 406). For example, the handheld device 200 may detect the directional measurement and/or orientation measurement in response to receiving a user input or may detect the measurements and generate the control signals or data only after receiving the user input. The control signals may be based at least partially on the user input (e.g., based on a numerical entry input by the user to indicate a distance, speed, travel time, mode, motor selection, or the like). The control signals may be generated by the handheld device 200 (e.g., by controller 202) or by a control system 162 in communication with one or more motors, or by a respective controller of a motor (e.g., controller 132, controller 144, and/or controller 156).

The control signals are transmitted to at least one motor (block 410). For example, the control signals are transmitted to the trolling motor 120, primary motor 122, and/or thruster 124 from the handheld device 200 or from the control system 162 and/or the respective controller of each motor (e.g., controller 132, controller 144, and/or controller 156) in response to data (e.g., measurement data) received from the handheld device 200. A control signal may cause the control system 162 and/or the controller (e.g., controller 132, controller 144, and/or controller 156) of at least one motor (e.g., trolling motor 120, primary motor 122, and/or thruster 124) to activate/deactivate or adjust a speed of the motor based on the control signal (block 412). A control signal may cause the control system 162 and/or the controller (e.g., controller 132, controller 144, and/or controller 156) of at least one motor (e.g., trolling motor 120, primary motor 122, and/or thruster 124) to adjust (e.g., set or change) the direction of rotation of the motor based on the control signal (block 414). A control signal may cause the control system 162 and/or the controller (e.g., controller 132, controller 144, and/or controller 156) of at least one motor (e.g., trolling motor 120, primary motor 122, and/or thruster 124) to steer the motor (e.g., turn the motor in a first direction or a second direction) based on the control signal (block 416). In implementations, one motor or multiple motors (e.g., trolling motor 120, primary motor 122, and/or thruster 124) of the marine vessel 100 are controlled by adjusting one or more operating parameters (e.g., direction of rotation, speed, and heading) based on control signals generated according to pointing direction, orientation, user inputs, and/or other sensor data from the handheld device 200. In some implementations, a motor (e.g., trolling motor 120, primary motor 122, and/or thruster 124) can also communicate sensory data (e.g., heading, rotational speed, etc.) to the handheld device 200 that affects the control signals or data communicated from the handheld device 200 to the motors or control system 162.

Although the technology has been described with reference to the embodiments illustrated in the attached drawing figures, it is noted that equivalents may be employed and substitutions made herein without departing from the scope of the technology as recited in the claims. For example, the components described herein need not be physically connected to one another since wireless communication among the various depicted components is permissible and intended to fall within the scope of the present invention. Components illustrated and described herein are merely examples of a device and components that may be used to implement the embodiments of the present invention and may be replaced with other devices and components without departing from the scope of the invention.

Having thus described various embodiments of the technology, what is claimed as new and desired to be protected by Letters Patent includes the following:

What is claimed is:

1. A handheld device for navigating a marine vessel, the handheld device comprising:
   a handheld housing;
   a transmitter;
   a magnetometer configured to generate a directional measurement, the directional measurement corresponding to a current pointing direction of the housing;
   a memory configured to store the directional measurement; and
   a controller communicatively coupled to the transmitter, the magnetometer, and the memory, the controller configured to:
      generate a control signal based on the directional measurement,
      control the transmitter to wirelessly communicate the control signal to a motor of the marine vessel;
   wherein operation of the motor using the control signal causes the marine vessel to travel in a direction corresponding to the pointing direction of the housing.

2. The handheld device of claim 1, further comprising an inertial sensor communicatively coupled with the controller and the memory, wherein the inertial sensor is configured to generate an orientation measurement, the orientation measurement being a current orientation of the housing, and wherein the controller is further configured to generate the control signal at least partially based on the orientation measurement.

3. The handheld device of claim 2, wherein the controller is further configured to determine a distance for the marine vessel to travel based on the orientation measurement, and wherein the control signal is at least partially based on the determined distance.

4. The handheld device of claim 1, wherein the controller is further configured to determine an adjustment to a direction of a propulsion motor housing based on the directional measurement, and wherein the control signal is at least partially based on the determined adjustment.

5. The handheld device of claim 1, further comprising an input device communicatively coupled to the controller, wherein the controller is further configured to generate the control signal based on the directional measurement when a user input is received from the input device, and wherein the directional measurement further corresponds to a selected direction of travel.

6. The handheld device of claim 5, further comprising a user interface, wherein the controller is further configured to receive selection of a numerical value from the input device, and wherein the control signal is at least partially based on the numerical value.

7. The handheld device of claim 5, wherein the input device comprises at least one of an electromechanical input device, a touch-sensitive input device, a pressure-sensitive input device, or an audio input device.

8. A handheld device for navigating a marine vessel, the handheld device comprising:
   a handheld housing;
   an input device;
   a transmitter;
   a magnetometer configured to generate a directional measurement, the directional measurement corresponding to a current pointing direction of the housing; and
   a memory configured to store the directional measurement;
   a controller communicatively coupled to the input device, the transmitter, the magnetometer, and the memory, the controller configured to:
      generate a control signal including the directional measurement, and
      control the transmitter to wirelessly communicate the control signal to a motor of the marine vessel when a user input is received from the input device;
   wherein operation of the motor using the control signal causes the marine vessel to travel in a direction corresponding to the pointing direction of the housing.

9. The handheld device of claim 8, wherein the directional measurement further corresponds to a direction of travel.

10. The handheld device of claim 8, further compromising a receiver configured to receive informational data from the motor, the informational data including a direction of a propulsion motor housing of the motor.

11. The handheld device of claim 10, wherein the controller is further configured to determine an adjustment to the direction of the propulsion motor housing based on the directional measurement, and wherein the control signal is at least partially based on the determined adjustment.

12. The handheld device of claim 8, further comprising an inertial sensor communicatively coupled with the controller and configured to generate an orientation measurement, the orientation measurement being a current orientation of the housing, and wherein the controller is further configured to generate the control signal at least partially based on the orientation measurement.

* * * * *